United States Patent
Itoh et al.

(10) Patent No.: US 7,436,798 B2
(45) Date of Patent: Oct. 14, 2008

(54) COMMUNICATION SYSTEM, COMMUNICATION TERMINAL APPARATUS, WIRELESS KEY APPARATUS AND PROGRAM

(75) Inventors: Katsutoshi Itoh, Tokyo (JP); Mitsuyoshi Yasuda, Tokyo (JP); Makoto Natori, Saitama (JP); Osamu Yoshimura, Kanagawa (JP); Minoru Yokoshi, Tokyo (JP); Takeshi Itagaki, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 539 days.

(21) Appl. No.: 11/170,162

(22) Filed: Jun. 29, 2005

(65) Prior Publication Data

US 2006/0002335 A1    Jan. 5, 2006

(30) Foreign Application Priority Data

Jun. 30, 2004    (JP)    ............................ P2004-195059

(51) Int. Cl.
*H04Q 7/00*    (2006.01)
(52) U.S. Cl. ................ 370/328; 455/569.11; 455/575.1
(58) Field of Classification Search ................ 370/310, 370/328, 342; 455/418, 421, 404.2, 456.1, 455/569.1, 575.1
See application file for complete search history.

(56) References Cited

U.S. PATENT DOCUMENTS

| 6,151,493 | A | 11/2000 | Sasakura et al. |
| 2004/0204081 | A1* | 10/2004 | Kim ............................ 455/557 |
| 2006/0019678 | A1* | 1/2006 | Itoh et al. ................ 455/456.4 |

FOREIGN PATENT DOCUMENTS

| EP | 0 861 008 | 8/1998 |
| EP | 1 164 555 | 12/2001 |
| JP | 10-243059 | 9/1998 |
| JP | 11-88499 | 3/1999 |
| JP | 2001-144781 | 5/2001 |
| JP | 2001 352579 | 12/2001 |
| JP | 2003-87368 | 3/2003 |
| JP | 2003-179539 | 6/2003 |
| JP | 2004-172728 | 6/2004 |
| WO | WO 03 009620 | 1/2003 |

* cited by examiner

*Primary Examiner*—Nghi H Ly
(74) *Attorney, Agent, or Firm*—Frommer Lawrence & Haug LLP; William S. Frommer; Thomas F. Presson

(57) ABSTRACT

A communication system that includes a communication terminal apparatus and a wireless key apparatus and in which wireless communication is possible. A first communication mode attempts a wireless connection in a first period in order to carry out a wireless communication between the communication terminal apparatus and the wireless key apparatus and a second communication mode carries out a wireless communication between the communication terminal apparatus and the wireless key apparatus in a second period longer than that of the connection mode of the wireless connected state.

24 Claims, 15 Drawing Sheets

COMMUNICATION SYSTEM, COMMUNICATION TERMINAL APPARATUS, WIRELESS KEY APPARATUS AND PROGRAM

CROSS REFERENCES TO RELATED APPLICATIONS

The present invention contains has recognized/(object) matter related to Japanese Patent Application JP 2004-195059 filed in the Japanese Patent Office on Jun. 30, 2004, the entire contents of which being incorporated herein by reference.

BACKGROUND OF THE INVENTION

1. Field of the Invention

The present invention relates, for example, to a communication system suitable for being applied to an apparatus constituted by a communication terminal apparatus such as a mobile telephone terminal and a wireless key apparatus restricting the operation of the communication terminal apparatus, to a communication terminal apparatus and a wireless key apparatus constituting the communication system and to a program realizing the function thereof.

2. Description of the Related Art

In recent years, a mobile telephone terminal which is one of communication terminal apparatuses a user always taking along in possession has a trend such that various functions other than wireless telephone functions of primary functions are built-in so as to contain multi functions.

For example, there exists such a terminal in which a camera function carrying out a filming of a still picture and a moving picture, a recording and reproducing function of music data, a viewing and listening function of television broadcast or the like is built-in.

In addition, there has been developed a mobile telephone terminal in which a function as a non-contacting IC card which has been prevailing rapidly in recent years is built-in. This non-contacting IC card is utilized as a boarding ticket of transport facilities, a membership card, an employee ID card, a card for price settlement means at a shop or the like where an authentication process is carried out by performing wireless communication between adjacent reader and writer, so that it is easy-to-use as compared with a magnetic card or the like. It should be noted in a case when an IC card function unit is mounted in a mobile terminal that the IC card function unit is not always necessarily to have a card type shape.

And now, it is preferable for the mobile telephone terminal having multi functions in this manner to be carried out with a process in order to secure some kind or another security for preventing various functions provided in the terminal from being abused when the terminal is lost. In particular, in case of a terminal installed with an IC card function unit, there is a possibility that personal information stored as the IC card function is read out unjustly or unjust settlement or the like utilizing the IC card function is carried out, so that the necessity for a function for preventing the unjust use thereof is high. There are descriptions, for example, in patent documents 1 and 2 that a wireless card which forms a pair with respect to the mobile telephone terminal is prepared and authentication request is wireless-transmitted periodically from that wireless card such that the functions of mobile telephone terminal is made to be restricted in a case when collation with respect to the authentication request cannot be taken.

[Patent Document 1] Jap. laid-open patent publication No. 2001-352579

[patent document 2] Jap. laid-open patent publication No. 2001-358827

However, if it is attempted to provide in a mobile telephone terminal with a communication circuit for carrying out an exclusive authentication process or authentication processing means for carrying out function limitation of that terminal such as shown in the descriptions in the patent documents 1 and 2, there is a problem that the constitution of the terminal becomes complicated. In case of carrying out such a wireless communication for the function limitation, if various wireless communication systems existing in the related art can be applied as they are, it is to contribute to lowering the cost of a mobile terminal.

However, in a case when it is considered to use various wireless communication systems existing in the related art as they are for the purpose of security assuring, a case is supposed in which the function limitation does not always function effectively. More specifically, it is fundamental for a commonly used wireless communication system to carry out a wireless communication with a terminal of a partner as favorably as possible within the specification given by the wireless system. Consequently, for example, a wireless card for carrying out function limitation of a mobile telephone terminal and its terminal is prepared and even if a system is composed assuming that the function of the mobile telephone terminal is made to be limited in a case when the distance between the both sides becomes apart equal or more than around several meters, it is practically difficult to define one-sidedly a distance which makes the wireless communication possible between the mobile telephone terminal and the wireless card such that it is supposed that there were various problems for making it practicable. More specifically, in case of a favorable communication environment, the function limitation is made effective after a quite far distance and in case of an inferior communication environment on the contrary, the wireless communication cannot be carried out even if the mobile telephone terminal and the wireless card are adjacent and the function limitation is made effective.

Also, it is preferable for an apparatus such as a wireless card or the like which is used as a pair with a mobile telephone terminal not to take a lot of trouble as much as possible for everyday use, but practically, relatively a large power consumption occurs when it always exchanges data for authentication or the like with a mobile telephone terminal, so that it is frequently necessary to exchange or charge a battery and there was a problem that it took a lot of trouble for functioning it as an authentication apparatus.

SUMMARY OF THE INVENTION

The present invention was invented in view of aforesaid matters and has recognized that the operation for limiting the function of a communication terminal apparatus such, for example, as a mobile telephone terminal is made to function favorably by using wireless.

The present invention constitutes a communication system capable of a wireless communication in a predetermined wireless communication system including a communication terminal apparatus and a wireless key apparatus and having at least a first communication mode attempting a wireless connection by a first period for carrying out a wireless connection between said communication terminal apparatus and the wireless key apparatus and a second communication mode carrying out a wireless communication between said communication terminal apparatus and the wireless key apparatus by a second period longer than said connection mode in a case when said wireless connection is performed.

The communication terminal apparatus is provided with a first communication means performing a wireless communication with said wireless key apparatus by said predetermined wireless communication system, a normal mode making a predetermined function of said communication terminal apparatus be operable, mode setting means setting a limitation mode which limits the function operation of said predetermined, and first control means for setting said mode setting means to a normal mode in a case when said first communication means communicates with said wireless key apparatus by being set in said second communication mode and for controlling said mode setting means so as to be set in a function limitation mode in a case when it communicates by being set in said first communication mode.

Also, the wireless key apparatus is provided with second communication means performing a wireless communication with said communication terminal apparatus by said predetermined wireless communication system, first warning means performing a predetermined warning operation, and second control means for controlling said warning means to carry out a warning operation in a case when said second communication means is setting-changed from said second communication mode to said first communication mode.

By constituting in this manner, the function of the communication terminal apparatus is never limited during a period when the wireless communication state between the communication terminal apparatus and the wireless key apparatus is stable and the communication mode between the both sides is in a second communication mode. Then, when it happens that the wireless communication state between the communication terminal apparatus and the wireless key apparatus is not in a stable state, it is changed from the second communication mode to the first communication mode and a warning means, for example, on the side of the wireless key apparatus is actuated. Consequently, the warning means is actuated in a case when the distance between the communication terminal apparatus and the wireless key apparatus becomes far. Then, the function of the communication terminal apparatus is limited when it becomes a state in which the state changed to the first communication mode is maintained or when the wireless communication between both sides is to be cut off.

According to the present invention, it becomes a mode in which the function of the communication terminal apparatus is limited depending on the setting state of the wireless communication mode between communication terminal apparatus and the wireless key apparatus, so that it is possible to construct a wireless key system in which a reliable security assuring can be carried out with a low power consumption efficiently and also with a low cost by utilizing an existing wireless communication system in which a plurality of wireless communication modes between apparatuses are prepared.

In this case, the communication terminal apparatus is a wireless telephone terminal provided with communication means for a telephone communication which carries out a wireless communication for a telephone communication with a predetermined base station, so that security assuring of a so-called mobile telephone terminal can be realized by a simple constitution. In particular, an existing short distance wireless communication system prepared, for example, for a head set or the like is applied, so that it is possible to constitute it as a terminal which carries out the process of the present invention only by applying a slight change of a control constitution or the like to a terminal installed with a wireless communication function.

In addition, with respect also to the communication terminal apparatus, in a case when warning means is provided and the communication mode with the wireless key apparatus is setting-changed from the second communication mode to the first communication mode, it is constituted such that the warning means is actuated for a predetermined period, so that abnormality of the terminal can be recognized easily according to a ringing sound or the like from the communication terminal apparatus.

It is possible for the wireless key apparatus to be provided with operation means. As for a process in a case when the operation means of the wireless key apparatus side is operated, it can be constituted, for example, such that the transmission power of the communication means in the wireless key apparatus is returned to a low transmission power after it is made high. In this case, it returns to a low transmission power after it went to a high transmission power, so that the communication state becomes unstable temporarily and the communication terminal apparatus returns to the first communication mode. Therefore, a warning operation is carried out. More specifically, it is possible to carry out a temporal warning operation according to an operation of a user.

Also, the wireless key apparatus is provided with mode display means and it is possible to display information showing a mode which was set for the communication terminal apparatus on that mode display means.

DESCRIPTION OF THE PREFERRED EMBODIMENTS

Hereinafter, one exemplified embodiment of the present invention will be explained with reference to FIGS. 1 to 19.

In the present invention, a wireless key apparatus carrying out a wireless communication with a mobile telephone terminal apparatus is prepared and it is constituted such that security lock of the mobile telephone terminal apparatus is to be carried out according to a wireless communication state of the both sides.

Figure 1:
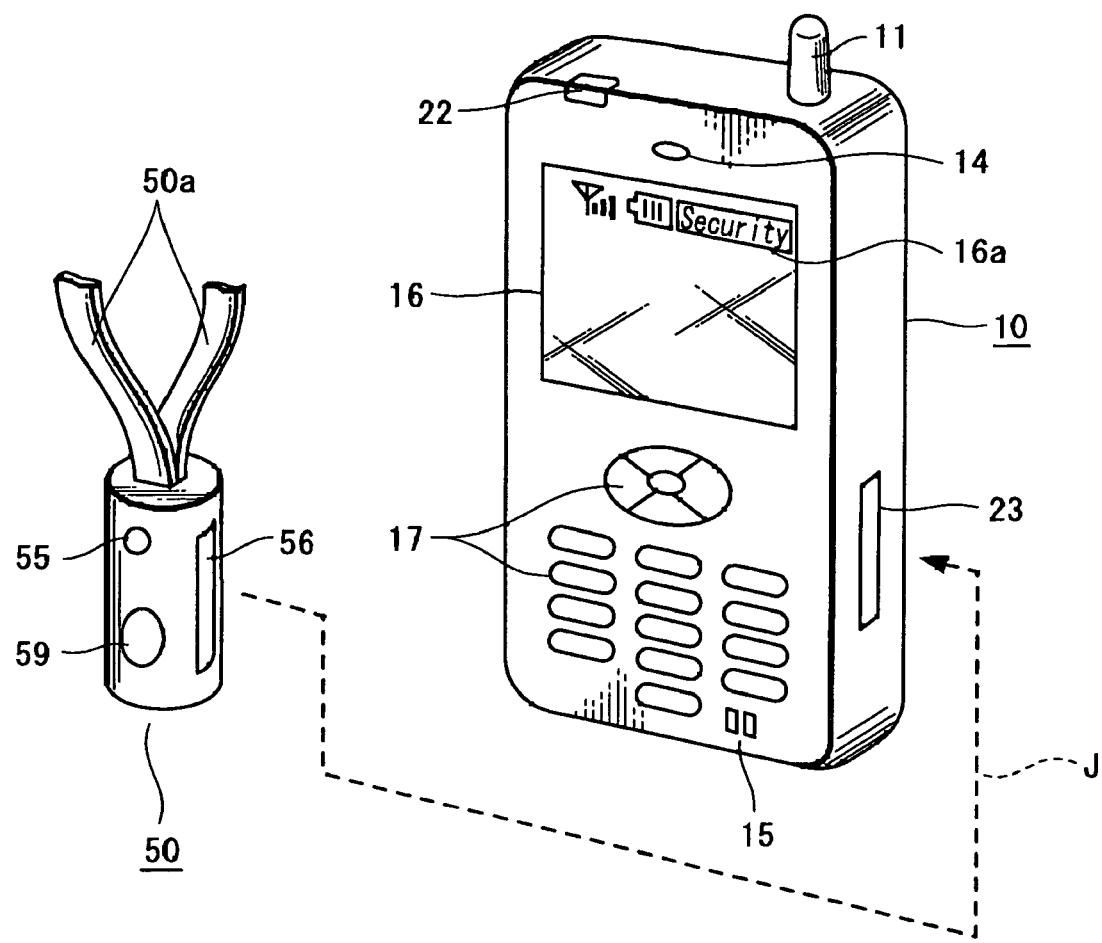
FIG. 1 is a perspective view showing a system constitutional example according to one exemplified embodiment of the present invention.

FIG. 1 is a diagram showing an example of an apparatus of the present invention. A wireless key apparatus 50 is prepared as a separate body with a mobile telephone terminal apparatus 10. According to this example, the wireless key apparatus 50 is constituted in a smaller size as compared with the mobile telephone terminal apparatus 10 and, for example, it is constituted such that it is hung around the neck of a user by a neck strap 50a or the like and is made to be a small sized shape which a user can always wear. The wireless key apparatus 50 is arranged with a light emitting unit 55 and an operation unit 59 (constituted in FIG. 1 such that they are push button shaped). It is also constituted such that a terminal unit 56 for connecting with the mobile telephone terminal apparatus 10 is prepared.

As a mobile telephone terminal apparatus 10, there is shown here an example of a general mobile telephone terminal. In the mobile telephone terminal apparatus 10, there are arranged an antenna 11 for a wireless telephone communication, a speaker 14, a microphone 15, a display unit 16, an operation unit (operation key) 17, a light emitting unit 22 and the like. Also, a terminal unit 23 for connecting with the wireless key apparatus 50 is prepared. This terminal unit 23 may be used as an existing terminal which is prepared for the mobile telephone terminal apparatus 10 to be connected with a charger or various external apparatuses. Also, it may be constituted in the display unit 16 such, for example, that a security display 16a showing that it is in an operation under a state that security is assured as explained hereinafter and a display (not shown) showing a fact that a so-called security lock in which the operation is limited according to its security function is executed may be carried out.

Figure 2:
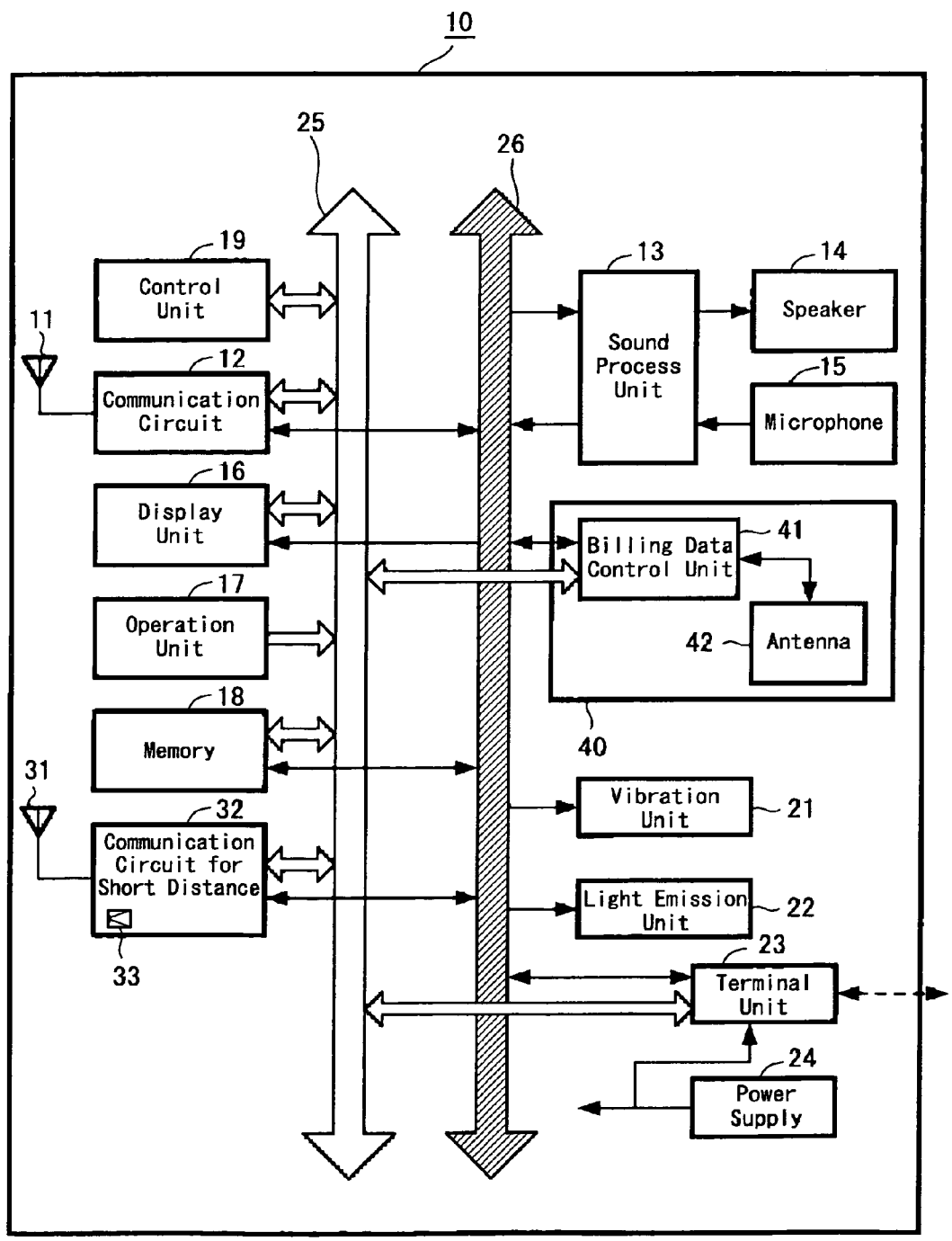
FIG. 2 is a block diagram showing a constitutional example of a communication terminal apparatus according to one exemplified embodiment of the present invention.

Next, a constitutional example of the mobile telephone terminal apparatus 10 of the present invention will be explained with reference to FIG. 2. The mobile telephone terminal apparatus 10 of the present invention is provided with an antenna 11 for a wireless telephone communication for carrying out a wireless communication with a base station for a wireless telephone. The antenna 11 is connected to a communication circuit 12 for a wireless telephone communication so as to carry out a wireless communication with the base station under a control of a control unit 19. When a communication for a telephone call is carried out in the communication circuit 12, received sound data are supplied to a sound data processing unit 13 so as to perform a receiving process of the sound data and thereafter, they are supplied to a speaker 14 to be outputted and also, sound data for transmission which are picked up by a microphone 15 and processed in the sound data processing unit 13 are supplied to the communication circuit 12 to be transmitted.

The mobile telephone terminal apparatus 10 is provided with a display unit 16 constituted by a liquid crystal display or the like and an operation unit 17 constituted by operation keys or the like. It is possible to display a mail sentence, a picture screen accessed to the web or the like on the display unit 16 an input operation of a telephone number, a mail sentence or the like and various mode settings or the like can be carried out by an operation unit 17.

These respective blocks in the terminal apparatus 10 are connected with the control unit 19 or the like by way of a control line 25. Also, each block is constituted such that data transfer can be carried out by way of a data line 26 so as to store necessary data in a memory 18. In the memory 18, not only data necessary as a mobile telephone terminal are stored but also it is possible to store data necessary in an IC card function unit 40 which will be described later on. Also, a necessary data saving for executing a program and/or for realizing the security function thereof can be carried out in the memory 18.

Also, the mobile terminal apparatus 10 is provided with a vibration unit 21 constituted by a vibration motor or the like which vibrates the terminal itself for carrying out notification of receiving signal by way of the telephone line to this terminal apparatus 10 and various warnings and a light emitting unit 22 constituted by a light emitting diode or the like. Then, the vibration and the light emission are carried out under a control of the control unit 19. These vibration unit 21 and light emitting unit 22 are used as notification means for notifying receiving signal or the like for the mobile telephone terminal and they are used also for necessary warning means as a security function. It should be noted that it is possible to output warning sound from the speaker 14 or the like in a case when sound is to ring as necessary warning means in the security function.

Then, the mobile telephone terminal 10 of the present invention is provided with a communication circuit 32 for short distance wireless communication in addition to the communication circuit 12 for telephone communication. Then, it is carried out by using this communication circuit 32 a wireless communication with a partner within a relatively narrow region of, for example, around from several meters to hundred meters at the maximum by way of a connected antenna 31 (however, it is constituted such that a process for narrowing the communication possible region is to be executed when carrying out a communication during a normal period with the wireless key apparatus as will be described later on). Here, for example, a wireless communication system for short distance referred to as Bluetooth® is applied. In this short distance wireless communication, various kinds of use applications are supposed such, for example, that a communication is carried out with a head set for a hands-free telephone call or a communication with a personal computer apparatus is carried out through the mobile telephone terminal apparatus 10. As to the frequency band used for the wireless communication, for example, 2 GHz band is used, it is constituted such that a frequency band or modulation system which does not intervene in the wireless telephone communication in the communication circuit 12 is employed. According to this constitution, it is possible to carry out the wireless telephone communication in the communication circuit 12 and the communication in the communication circuit 32 for short distance wireless communication at the same time.

In case of this example, a wireless communication is carried out with a wireless key apparatus 50 by using this communication circuit 32 for short distance communication. However, a wireless communication is possible also with an apparatus (head set, personal computer apparatus or the like) other than the wireless key apparatus 50 if it is a communication apparatus of the same communication system. Also, in a case when a security function is executed, the wireless key apparatus 50 carrying out a wireless communication by the communication circuit 32 is to be limited to a specific one apparatus. For that purpose, for example, identification ID or the like of the apparatus is to be registered in the memory 18 or the like beforehand. With respect to registered information relating to this wireless key apparatus 50, it may be constituted such that a user cannot revise it.

A transmission amplifier 33 which amplifies the transmission signal in the communication circuit 32 is constituted such that transmission power is to be set in a plurality of steps by the control of the control unit 19 or the like. Also, in a state in which it is wireless-connected with the wireless key apparatus 50, it is constituted such that low transmission power among the plurality of steps is to be set. Further, in a state in which it is connected with an apparatus other than the wireless key apparatus 50, transmission power of a relatively high step is to be set. It should be noted in a case when it is wireless-connected with an apparatus installed a function for a wireless key apparatus such as a head set which will be described later on that the transmission power is to be set depending on the operation state of the partner apparatus at that time (more specifically, depending on whether or not it is operated only as a wireless key apparatus or whether or not combined another function is operated). It will be described later on with respect to a concrete process example for setting the transmission power.

The mobile telephone terminal 30 of the present invention is provided with a non-contacting IC card function unit 40. The non-contacting IC card function unit 40 includes a billing data control unit 41 connection to which an antenna 42 is connected and an adjacent wireless communication in a very adjacent distance of around several centimeters is carried out with reader and writer. In this adjacent wireless communication, it is possible to operate the billing data control unit 41 by means of the power obtained by receiving a radio wave from the reader and writer side, but according to this example, it is constituted such that the billing data control unit 41 is to be operated by the power supply supplied from a power supply circuit 24 in the mobile telephone terminal 10.

When the IC card function is executed, the billing data control unit 41 reads out data necessary for billing or authentication from the memory 18 (or a memory in the billing data control unit 41 (not shown)) and an exchange of the read out data is carried out with the reader and writer by an adjacent wireless communication. For example, in a case when it is functioned as a boarding ticket of transport facilities, it is constituted such that the billing data control unit 41 transmits data charged amount of money or the like which is possible to be paid by direct debit for an effective zone and an effective period as a boarding ticket (commutation ticket) or as a boarding ticket or personal information or the like relating to a person possessing this terminal (IC card) to the reader and writer so as to carry out a billing process or an authentication process. In case of using an employee ID card, a membership card, a card for price settlement, a credit card or the like, necessary information for its authentication is also exchanged.

Further, it is constituted such that the mobile telephone terminal apparatus 10 of the present invention is provided with a terminal unit 23 and various peripheral apparatuses, data process apparatuses which are not shown or the like can be connected directly thereto by way of this terminal 23. In this case, it is constituted such that power supply can be applied to external apparatuses connected by means of the terminal unit 23 from the power supply circuit 24 installed with a secondary battery or the like which applies power supply to respective portions in the mobile telephone terminal apparatus 10. For example, as shown by an arrow J of a dotted line in FIG. 1, it is constituted in a case when the terminal unit 56 of the wireless key apparatus 50 and the terminal unit 23 of this mobile telephone terminal apparatus 10 are connected directly such that it is possible to supply power to a secondary battery in the wireless key apparatus 50 from the power supply circuit 24 in the mobile telephone terminal apparatus 10 so as to charge it. Also, it is constituted in a case when the wireless key apparatus 50 is connected directly to the terminal unit 23 of the mobile telephone terminal apparatus 10 such that the control unit 19 of the mobile telephone terminal apparatus 10 detects that fact and a security process when directly connected (for example, security process executed without short distance wireless communication which will be described later on) is to be carried out.

Figure 3:
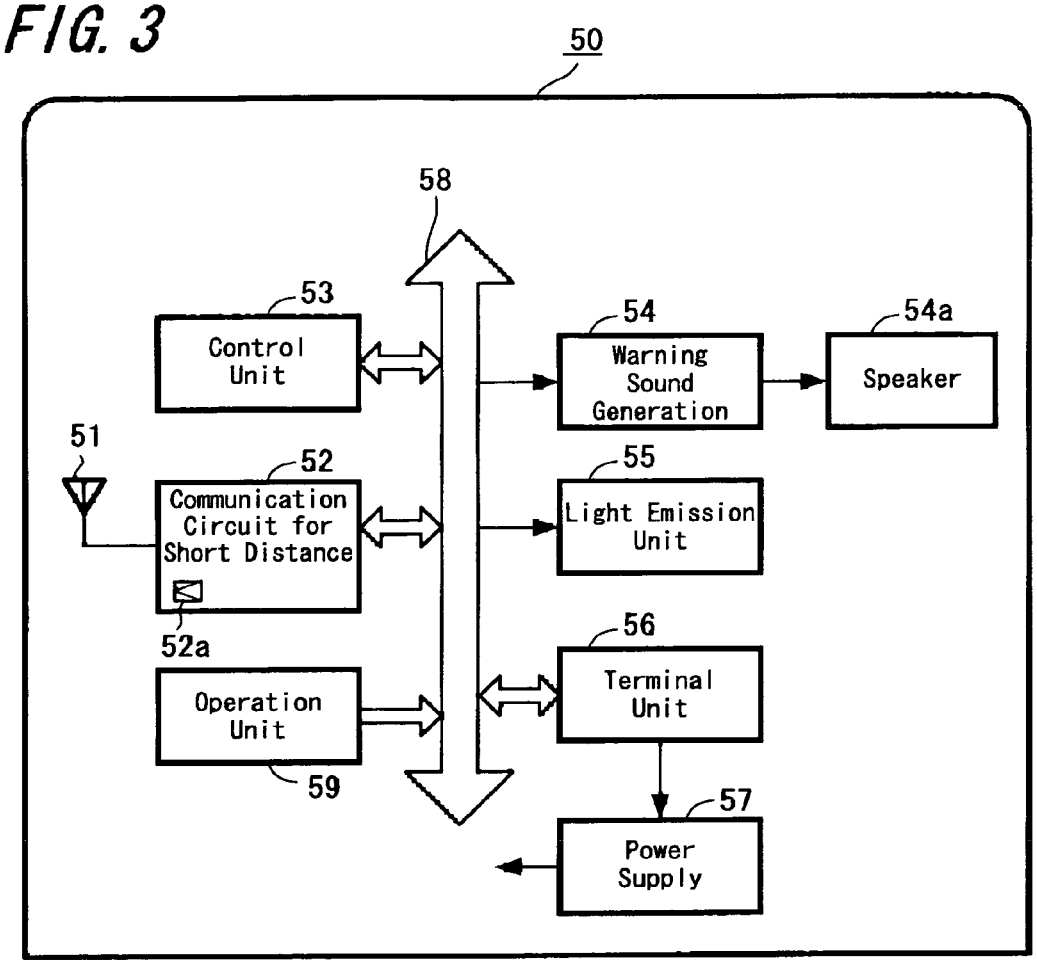
FIG. 3 is a block diagram showing a constitutional example of a wireless key apparatus according to one exemplified embodiment of the present invention.

Next, it will be explained with respect to the constitution of the wireless key apparatus 50 which carries out a wireless communication with the mobile telephone terminal apparatus 10 according to the present invention with reference to FIG. 3. The wireless key apparatus 50 of the present invention is provided with a communication circuit 52 for short distance wireless communication. Then, by using this communication circuit 52, a wireless communication is carried out with a partner in a relatively narrow region of, for example, around several meters and at the maximum hundred meters by way of a connected antenna 51 (however, it is constituted when communication is carried out normally with the mobile telephone terminal apparatus 10 such that a process for narrowing the communication possible region is executed). Here, it is constituted such that Bluetooth system which is a short distance wireless communication system provided on the mobile telephone terminal apparatus 10 side is also applied to the wireless key apparatus 50. The partner carrying out a wireless communication by the communication circuit 52 is limited to a specific one of the mobile telephone terminal apparatus 10. For that purpose, for example, the identification ID or the like of its apparatus was registered beforehand. With respect to the registered information as to the mobile telephone terminal apparatus 10, it may be constituted such that a user cannot revise it.

With respect to the wireless communication in the communication circuit 52, it is executed under a control of a control unit 53. In this case, it is constituted such that transmission power is to be set in a plurality of steps in a transmission amplifier 52a which amplifies a transmission signal in the communication circuit 52 under a control of the control unit 53 or the like. Also, in a state where it is wireless-connected with the mobile telephone terminal apparatus 10, a low transmission power is to be set in the plurality of steps. However, it is constituted in a case when the control unit 53 detects that an operation unit 59 (button shaped operation unit or the like as shown in FIG. 1) arranged in the wireless key apparatus 50 is operated such that a process for heightening the transmission power temporarily in the transmission amplifier 52a is to be carried out.

The wireless key apparatus 50 of this example is provided with a warning sound creation unit 54 connected with a speaker 54a for outputting warning sound and a light emitting unit 55 constituted by a light emitting diode or the like. Then, output of the warning sound, vibration and light emission are carried out under the control of the control unit 53. These warning sound creation unit 54 and light emitting unit 55 are used as warning means necessary for security function. Also, it is constituted such that the light emitting unit 55 functions also as display means which displays the security mode at present in a state where a wireless communication is carried out with the mobile telephone terminal apparatus 10 and the security function is operated. Specifically, for example, the light emitting unit 55 functions also as display means for displaying a security mode by changing the display such that when the light emitting unit 55 is blinking in green, it indicates that it is in a normal mode and when it is blinking in red, it indicates that it is in a warning mode, when there is no display at all, it indicates that it is in a function limitation mode, or the like. The display means for displaying the security mode may be constituted such that a liquid crystal display or the like is used and a display where modes can be recognized directly by characters and figures or the like is carried out. Also, it may be constituted as warning means for warning by vibration.

It is constituted such that the control unit 53 and each unit is connected by means of a control line 58 and a wireless communication in the communication circuit 52, operations in the warning sound creation unit 54 and the light emitting unit 55 and the like are executed under a control of the control unit 53.

Also, it is constituted such that the wireless key apparatus 50 of the present invention is provided with a terminal unit 56 and the mobile telephone terminal apparatus 10 can be connected directly by using this terminal 56. When connected thereof, the control unit 53 in the wireless key apparatus 50 carries out a data transfer directly with the control unit 19 in the mobile telephone terminal apparatus 10 and carries out a security process when directly connected without carrying out a short distance wireless communication. Also, in a case when remaining charge amount of the secondary battery installed in a power supply circuit 57 in the wireless key apparatus 50 is small, it is possible to charge the secondary battery in the power supply circuit 57 by a charge current supplied from the side of the mobile telephone terminal apparatus 10.

Figure 4:
FIG. 4 is an explanatory diagram showing a usage example according to one exemplified embodiment of the present invention.

When the mobile telephone terminal apparatus 10 and the wireless key apparatus 50 constituted in this manner are used, a user always carries the wireless key apparatus 50 as shown, for example, in FIG. 4. Then, it is constituted such that when the user uses the mobile telephone terminal apparatus 10, the function is not to be limited (normal mode which will be described later on). Then, in a case when a user goes away from the mobile telephone terminal apparatus 10 by a distance of a certain degree after putting the mobile telephone terminal apparatus 10 somewhere in a state where the wireless key apparatus 50 is always maintained to be carried, a warning operation is executed from the wireless key apparatus 50 (warning mode which will be described later on). If he stays away from the mobile telephone terminal apparatus 10 in a state where the warning operation is executed, it becomes a state where the function of the mobile telephone terminal apparatus 10 is limited (function limitation mode which will be described later on). It should be noted with respect to the warning operation in a warning mode that it may be constituted such that it is to be carried out only on the side of the mobile telephone terminal apparatus 10. Alternatively, it may be constituted such that the warning operation in the warning mode is to be carried out in both of the wireless key apparatus 50 and the mobile telephone terminal apparatus 10.

With respect to a function of the mobile telephone terminal apparatus 10 which is limited in a function limitation mode, it is a choice, for example, to direct to all of the functions of the mobile telephone terminal apparatus 10 (however, communication function related to security function is not to be limited) and it is another choice to direct to a partial function within the function which the terminal apparatus 10 is provided with. Specifically, it may be constituted, for example, such that only the process using the non-contacting IC card function unit 40 is to be limited. Also, it may be constituted such that address book inspection of the mobile telephone terminal apparatus 10, display of personal information of mail inspection or the like is to be limited. Also, it may be constituted such that only the reception of a signal can be allowed while the transmission as a wireless telephone is to be limited. Also, it may be constituted such that only the reception of a signal can be allowed while the transmission as a wireless telephone is to be limited. In this case, it may be constituted such that only the telephone number for emergency announcement to a police station or the like can be transmitted. Also, it may be constituted such that a process using the non-contacting IC card function unit 40 is not to be limited while only the function as a wireless telephone apparatus is to be limited.

The wireless key apparatus 50 explained so far was constituted as an apparatus for exclusive use which carries out only the security function, but it should be noted that it may be constituted such that it is to be mounted on an apparatus having other function. For example, it may be constituted such that a wireless key apparatus is to be mounted on a head set for carrying out a wireless communication of Bluetooth system with the mobile telephone terminal apparatus 10 and carrying out a so-called hands-free telephone call.

Figure 5:
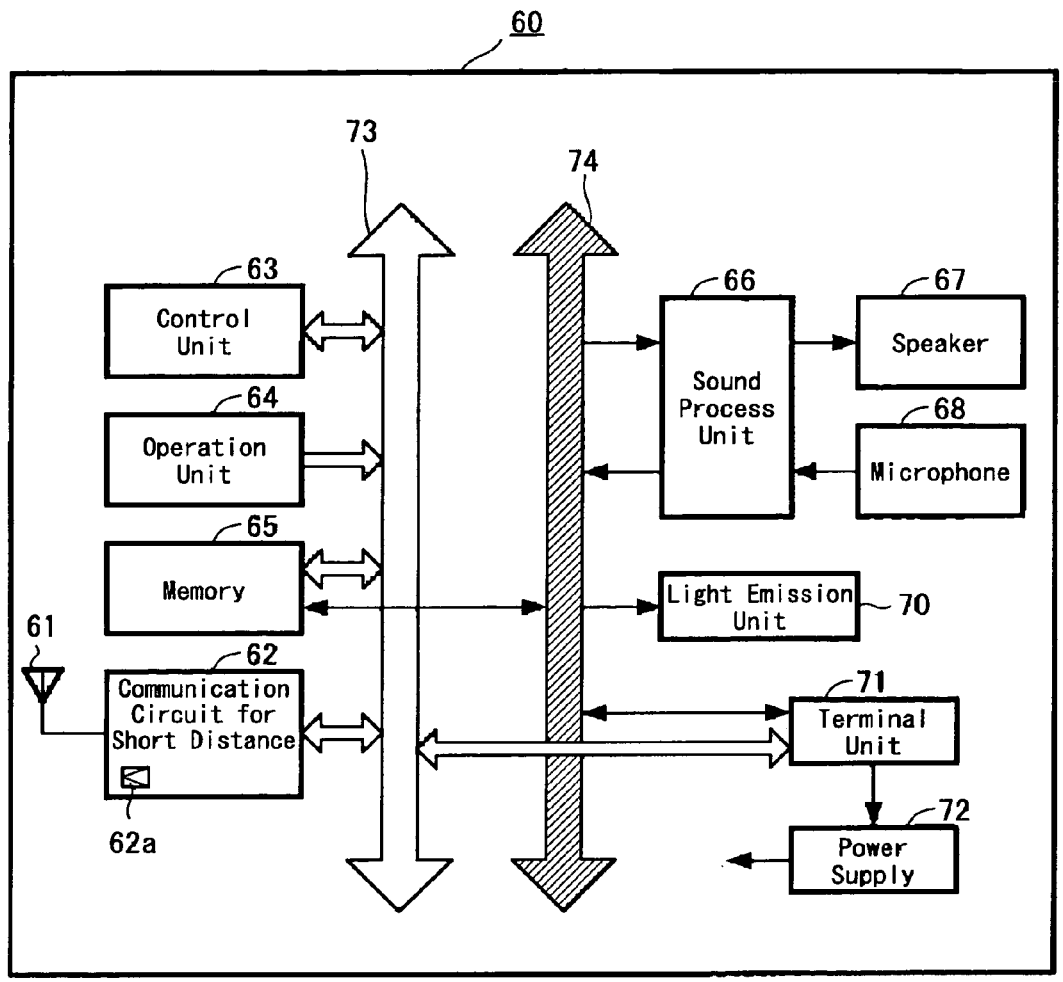
FIG. 5 is a block diagram showing a modified example of a wireless key apparatus (example integrated with head set) according to one exemplified embodiment of the present invention.

FIG. 5 is a diagram showing a constitutional example of a head set with this wireless key. A head set with a wireless key 60 according to the present invention is provided with a communication circuit 62 for short distance wireless communication. This communication circuit 62 carries out a wireless communication with a partner in a relatively narrow region of, for example, around several meters and at the maximum hundred meters by way of a connection antenna 61. Here, Bluetooth system which is the same system as the short distance wireless communication system provided on the side of the mobile telephone terminal apparatus 10 is applied also to the communication circuit 62 of the head set with the wireless key. The partner carrying out a wireless communication by the communication circuit 62 is limited to the specific one of the mobile telephone terminal apparatus 10 which was registered. For that purpose, for example, identification ID of the apparatus or the like is registered beforehand. However, it may be constituted when using only the head set such that there is no limitation for the partner whom the communication circuit 62 carries out a wireless communication.

With respect to the wireless communication in the communication circuit 62, it is executed under a control of the control unit 63. In this case, it is constituted such that transmission power for the transmission amplifier 62a which amplifies the transmission signal in the communication circuit 62 is to be set under a control of the control unit 63 or the like.

When a communication for the head set (more specifically, sound data communication for a telephone call) is carried out in the communication circuit 62, received sound data are supplied to a sound data processing unit 66 and a receiving process of the sound data is performed. Thereafter, they are supplied to a speaker 67 and outputted. Also, sound data picked up by a microphone 68 are processed in the sound data processing unit 66 so as to become sound data for transmission. Then, the sound data for transmission are supplied to the communication circuit 62 and transmitted.

In addition, the head set with the wireless key 60 of the present invention is provided with an operation unit 64 constituted by operation keys or the like, a memory 65 and a light emitting unit 70. The light emitting unit 70 is used as warning means relating to the security function and at the same time used also as display means of operation state on the occasion when it is functioned as a head set. These respective units in the head set 60 can carry out exchange of control data by way of a control line 73. Further, the respective units can carry out exchange of sound data or the like by way of a data line 74.

Also, the head set with the wireless key 60 of the present invention is provided with a terminal unit 71 and it is constituted such that the mobile telephone terminal apparatus 10 can be connected directly by means of this terminal 71. When connected with the mobile telephone terminal apparatus 10 directly, it is constituted such that the control unit 63 in the head set with the wireless key 60 carries out a data transfer directly with the control unit 19 in the mobile telephone terminal apparatus 10 and a direct sound data transfer or a security process is to be carried out without a short distance wireless communication. Also, in a case when remaining charge amount of a secondary battery installed in a power supply circuit 72 in the head set with the wireless key 60 is small, it is possible to charge the secondary battery in the power supply circuit 72 by an power supplied from the side of the mobile telephone terminal apparatus 10.

Figure 6:
FIG. 6 is an explanatory diagram showing a usage example of the example in FIG. 5.

In a case when such a head set with a wireless key 60 is prepared, as shown, for example, in FIG. 6, a user putting on the head set with the wireless key 60 can carry out a so-called hands-free telephone call depending on a fact that the mobile telephone terminal apparatus 10 which remains inside a bag or the like and the head set with the wireless key 60 carries out a wireless communication. Further, with respect to a function as a wireless key apparatus, a warning and a function limitation of the mobile telephone terminal apparatus 10 are executed according to position relationship (distance) between the head set with the wireless key 60 and the mobile telephone terminal apparatus 10. More specifically, in a case when the mobile telephone terminal apparatus 10 goes away from the head set with the wireless key 60 to a certain degree of distance, the head set with the wireless key 60 or the mobile telephone terminal apparatus 10 (alternatively, both sides) carries out a warning operation (warning mode which will be described later on). Then, if the user stays away from the mobile telephone terminal apparatus 10 in the state in which this warning operation was carried out, it becomes a state in which the function of the mobile telephone terminal apparatus 10 is limited (function limitation mode will be described later on).

Next, it will be explained with respect to a process example in a case when a security process is carried out by preparing the mobile telephone terminal apparatus 10 and the wireless key apparatus 50 of such a constitute. It should be noted that also a security process in case of using the head set with the wireless key 60 is basically similar, but it will be explained in the explanation hereinafter on the assumption that the wireless key apparatus 50 is used.

First, it will be explained with reference to FIG. 7 with respect to a security process mode (hereinafter designates as security process mode). It is constituted in case of this example such that there are prepared a normal mode M1 which does not limit the function of the mobile telephone terminal apparatus 10, a warning mode M2 for warning that it gets out of the normal mode caused by a fact that the distance between the mobile telephone terminal apparatus 10 and the wireless key apparatus 50 goes away or the like and a function limitation mode M3 for limiting the function of the mobile telephone terminal apparatus 10 in a case when it does not return to from the warning mode to the normal mode (more specifically, in a case when the distance between the mobile telephone terminal apparatus 10 and the wireless key apparatus 50 remains in a far state).

Figure 7:
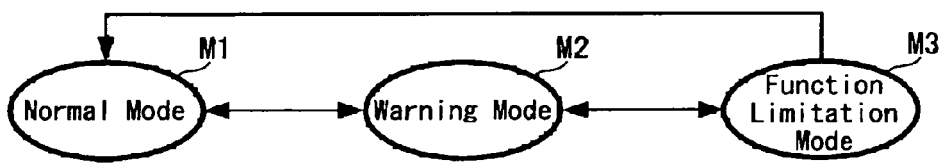
FIG. 7 is an explanatory diagram showing a setting example of a security mode according to one exemplified embodiment of the present invention.

With respect to the transition of these modes, there are, as shown by arrows in FIG. 7, a change from the normal mode M1 to the warning mode M2 and a change from the warning mode M2 to the function limitation mode M3 and further, it returns to the normal mode M1 if the wireless key apparatus 50 approaches the mobile telephone terminal apparatus 10 in a state in which it became the function limitation mode M3. Further, it returns to the normal mode M1 if the wireless key apparatus 50 approaches the mobile telephone terminal apparatus 10 in a state in which it became the warning mode M2 and the warning operation is carried out.

Figure 8:
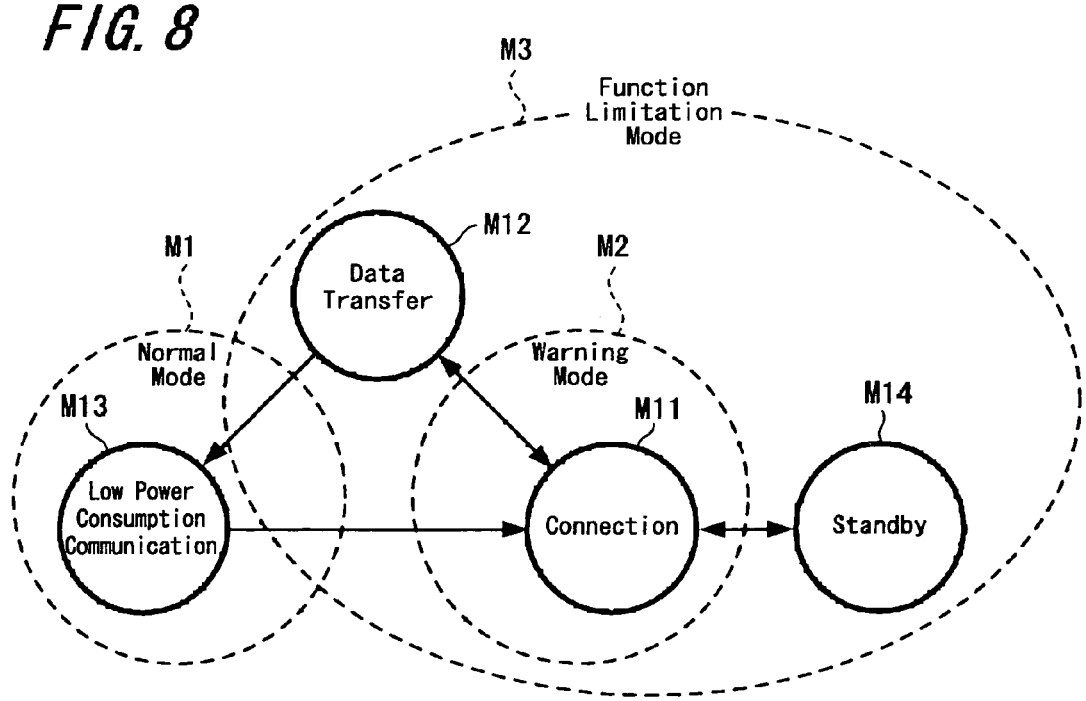
FIG. 8 is an explanatory diagram showing a transition example of a security mode by a communication mode according to one exemplified embodiment of the present invention.

In case of the present invention, these security modes are made to have relation with the communication modes prepared in the Bluetooth system which is a wireless communication system between the mobile telephone terminal apparatus 10 and the wireless key apparatus 50. More specifically, as communication modes in the wireless communication system (Bluetooth system) of this example are shown in FIG. 8, there is a connection mode M11 for authenticating and wireless-connecting the partner apparatus in both of the mobile telephone terminal apparatus 10 and the wireless key apparatus 50 and when authentication is completed mutually and connection is carried out in the connection mode M11, it becomes a data transfer mode M12 in which payload data transfer is carried out practically. When the data transfer is completed in the data transfer mode M12, it is shifted to a low power consumption communication mode M13. In this low power consumption communication mode M13, the wireless communications of both sides are carried out intermittently by a cycle longer than a communication cycle in the data transfer mode M12 and it becomes a state in which the wireless connection between the both sides is maintained. Owing to the fact that the cycle carrying out the intermittent communication is long in this manner, it becomes possible to make the power consumption required for the communication smaller than a case in which it is operated in the data transfer mode M12 and low power consumption is realized. It should be noted that the low power consumption here indicates a phenomenon that the low power consumption is realized by thinning out communication cycles and is not related directly to the process for lowering the transmission power which will be described later on (however, it is constituted as described later on such that a process for lowering transmission power is carried out during a low power consumption mode).

In a case when the data transfer between the both sides is to be restarted in a state of this low power consumption communication mode M13, it returns to the connection mode M11, a process for restarting the communication is carried out in the connection mode M11 and thereafter it becomes the data transfer mode M12 in which the data transfer is carried out practically. In a state in which the wireless connection is maintained in the low power consumption communication mode M13, the connection process in the connection mode M11 is carried out relatively simply and it is possible to carry out the restart of the data transfer rapidly as compared with a case in which the wireless connection is recommenced.

Also, in a case when a connection process with anyone of communication partners is not carried out in the connection mode M11 (or in a case when a connection is not possible), each apparatus is shifted to the standby mode M14. The apparatus which becomes this standby mode M14 carries out an intermittent reception or transmission with a very long cycle and carries out a process for searching whether or not a communication apparatus to become a partner exists. Here, it may be constituted such that the apparatus becoming the standby mode M14 does not return to the connection mode M11 if there is no process which may become some kind or another opportunity caused by a user operation or the like. Also, during a period when a communication is carried out between two apparatuses, the two apparatuses are to be set in the same mode basically. More specifically, at least the connection mode M11, the data transfer mode M12 and the low power consumption mode M13 are the modes which shift in synchronism with each other between the two apparatuses.

Here, in case of the present invention, as shown in FIG. 8, the normal mode M1 is set as a security mode when it is a state in which it communicated between the mobile telephone terminal apparatus 10 and the wireless key apparatus 50 in the low power consumption communication mode M13 and a warning mode is started by an opportunity that the communication mode shifts from the low power consumption communication mode M13 to the connection mode M11. The process with respect to the detail in which it is shifted from a warning mode to a function limitation mode will be described later on, but when the security mode becomes the function limitation mode M3, the function limitation mode M3 remains during a period when it is the connection mode M11, the data transfer mode M12 and the standby mode M14. It is constituted only in a case when it is shifted from the data transfer mode M12 to the low power consumption communication mode M13 such that the security mode is to return from the function limitation mode M3 to the normal mode M1.

Figure 9:
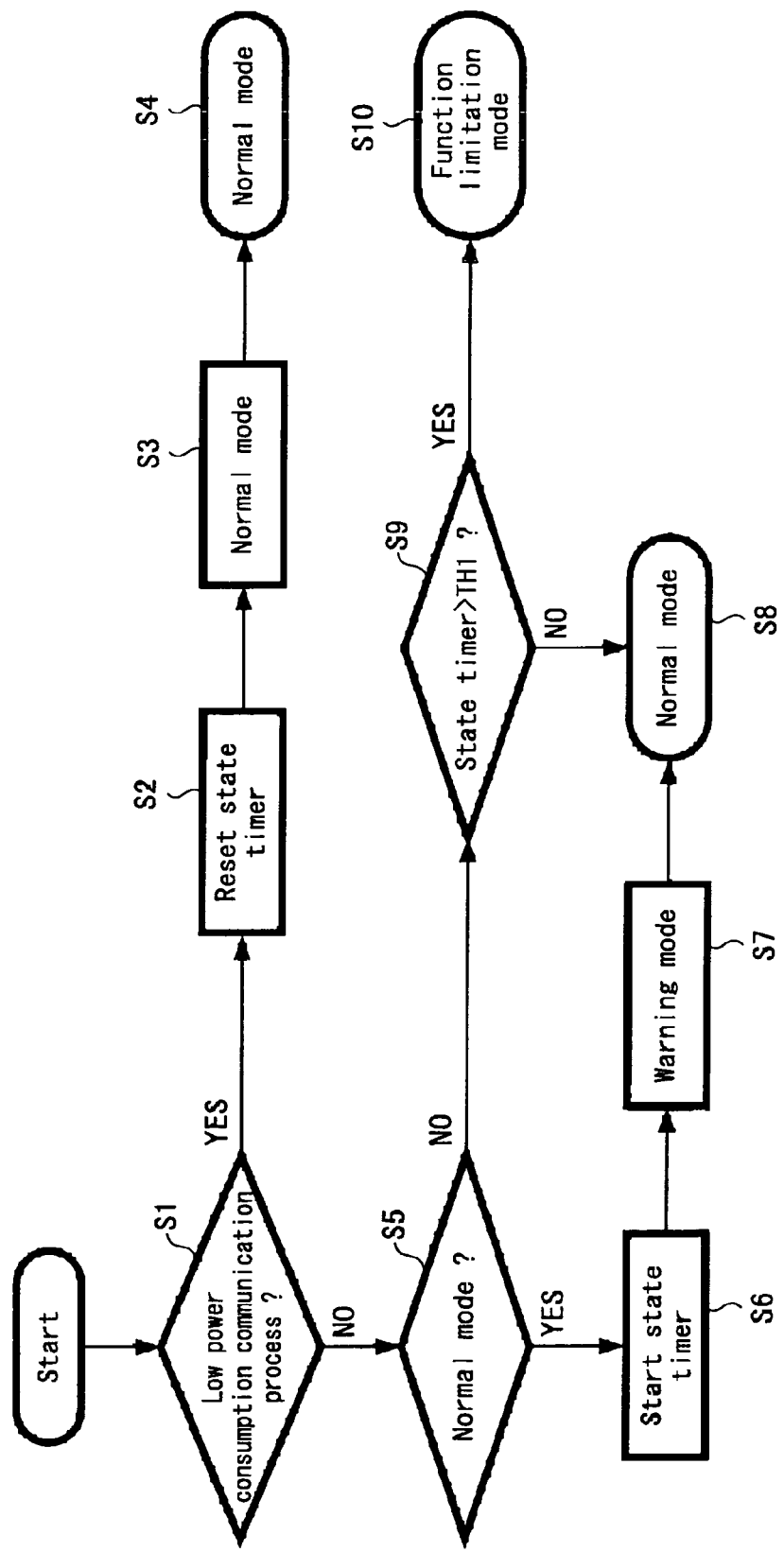
FIG. 9 is a flowchart showing a mode selection process example according to one exemplified embodiment of the present invention.

Next, it will be explained a process in which the security mode is selected in each of the mobile telephone terminal apparatus 10 and the wireless key apparatus 50 with reference to FIG. 9. This security mode selection process is, for example, executed under the control of the control units 19 and 53 of the respective apparatuses.

First, it is judged whether or not the communication mode at present is in a low power consumption communication mode (step S1). Here, in a case when it is in a low power consumption communication mode, a state timer prepared in the control unit is reset (step S2). Then, the security mode is set to a normal mode (step S3) and a process as a normal mode (more specifically, a mode without limiting the function) is executed (step S4). It should be noted that the state timer is a timer counted up by passage of time.

Also, in a case when it is judged in step S1 that it is not in a low power consumption communication mode, it is judged whether or not the security mode just before (at present) is a normal mode (step S5). Here, in case of a normal mode, a state timer prepared in the control unit is made to start (step S6). Then, a start of a warning mode is set (step S7) and a warning operation as a warning mode is executed (step S8). It should be noted that in a case when it is constituted such that only one of the mobile telephone terminal apparatus 10 and the wireless key apparatus 50 carries out the warning operation, any process is not carried out particularly in the other apparatus during the warning mode.

Then, in a case when it is judged in step S5 that the security mode just before (at present) is not a normal mode, it is judged whether or not the counted value of the state timer activated in step S6 exceeds a value TH determined beforehand (step S9). It remains in the warning mode of step S8 until the counted value exceeds the predetermined value TH1 and in a case when the counted value exceeds the predetermined value TH1, it is made to change the security mode to a warning mode (step S10). It is designed such that the time period when the counted value of the state timer exceeds the predetermined value TH1 after the count is started is a time period, for example, of around several seconds to several ten seconds.

Next, it will be explained with reference to the drawings of FIG. 10 and subsequent thereto about a specific example of a communication state in each communication mode in each of the mobile telephone terminal apparatus 10 and the wireless key apparatus 50. First, it will be explained an example in which the mobile telephone terminal apparatus 10 and the wireless key apparatus 50 carry out the authentication process of a partner in the connection mode M11.

In case of carrying out a wireless communication by Bluetooth system, one of the communication apparatus of the two apparatuses carrying out the communication becomes a master apparatus and the other communication apparatus becomes a slave apparatus. For the Bluetooth system, either one of the apparatuses may become a master or a slave, but in case of the present invention, it is to be set such that the wireless key apparatus 50 becomes a master and the mobile telephone terminal apparatus 10 becomes a slave.

The apparatus which became a slave (mobile telephone terminal apparatus 10 here) carries out a scan process for searching the master in a connection mode. FIG. 10 is a flowchart showing an operation example in this scan process. In the scan process, continuous reception is carried out for a constant period and a process for searching a signal from the master is carried out (step S11). It is judged in its scan process whether or not a signal (page signal) added with an ID number of the wireless key apparatus 50 which is a partner carrying out the security process was received (step S12). Here, in a case when signal added with the ID number of the wireless key apparatus 50 is not received, it is shifted to an idle process so as to wait for a constant period (step S13) and thereafter it returned to step S11 such that the scan process is repeated.

Then, in a case when it is judged in step S12 that the page signal added with the ID number of the wireless key apparatus 50 was received, a response signal with respect to that page signal is transmitted (step S14) and it is shifted to a communication state by carrying out a connection process with the master (more specifically, shifted to a data transfer mode M12) (step S16).

Next, FIG. 11 will be explained. The apparatus which became a master (here, wireless key apparatus 50) starts a standby timer when the connection mode starts (step S21). A page signal is transmitted by a determined channel for a predetermined period (step S22). At that time, for example, an ID number which was set for the own apparatus is added to the page signal and at the same time, the ID number of the communication partner is also added. Then, it is judged whether or not there is a response from the slave after the transmission of the page signal (step S23). In case of no response, it is judged whether or not the counted value of the standby timer exceeds a determined time period TH2 (step S24). In a case when the counted value of the standby timer does not exceed the determined time period TH2, it is shifted to an idle process and it waits for a constant period (step S25) and thereafter, it returns to step S22 and the transmission process of the page signal is repeated.

Then, in a case when it is judged in step S23 that there is a response from the slave, a connection process with the slave is performed and it is shifted to a communication state (more specifically, shifted to a data transfer mode) (step S27). Also, in a case when the counted value of the standby timer exceeds the determined time period TH2 in step S24, it becomes a standby state (step S28) and a process for attempting a connection with the slave here is discontinued.

Figure 10:
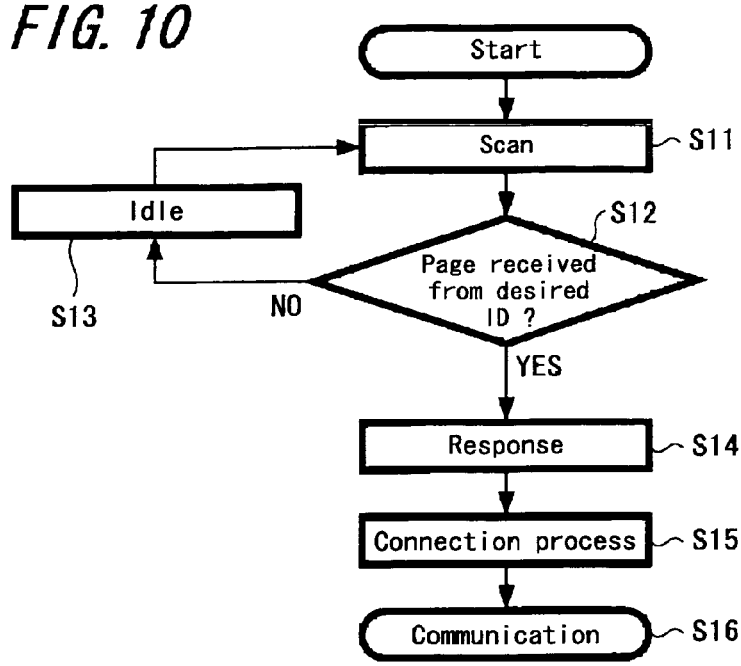
FIG. 10 is a flowchart showing a scanning process example according to one exemplified embodiment of the present invention.
Figure 11:
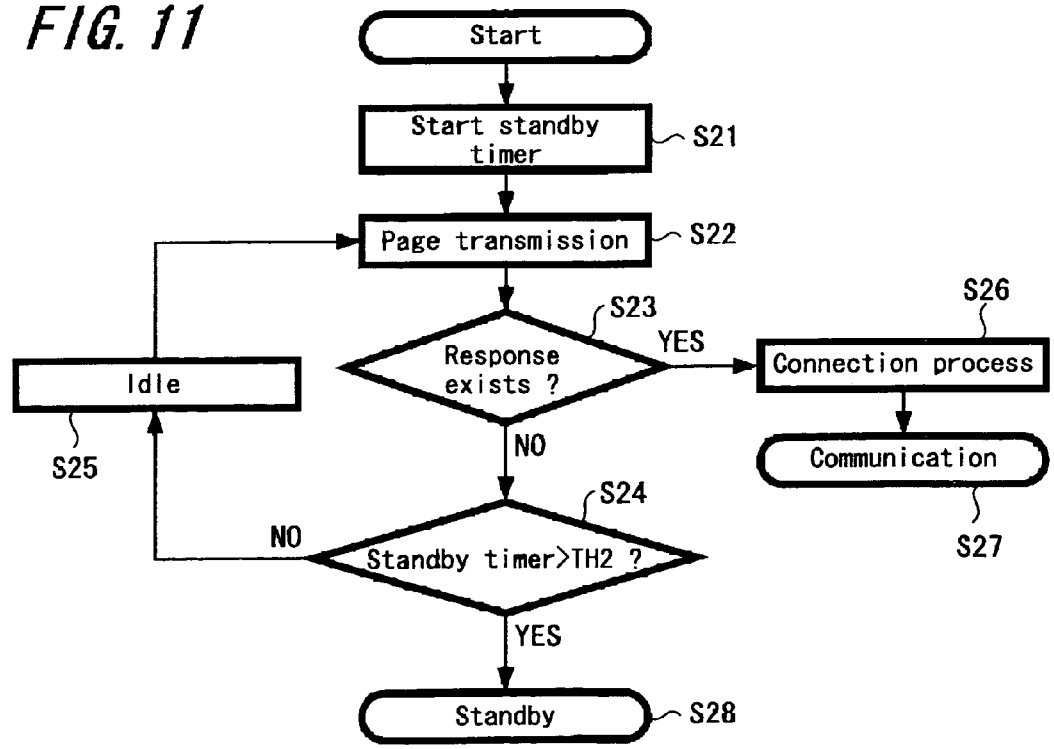
FIG. 11 is a flowchart showing a page transmission process example according to one exemplified embodiment of the present invention.
Figures 12A, 12B:
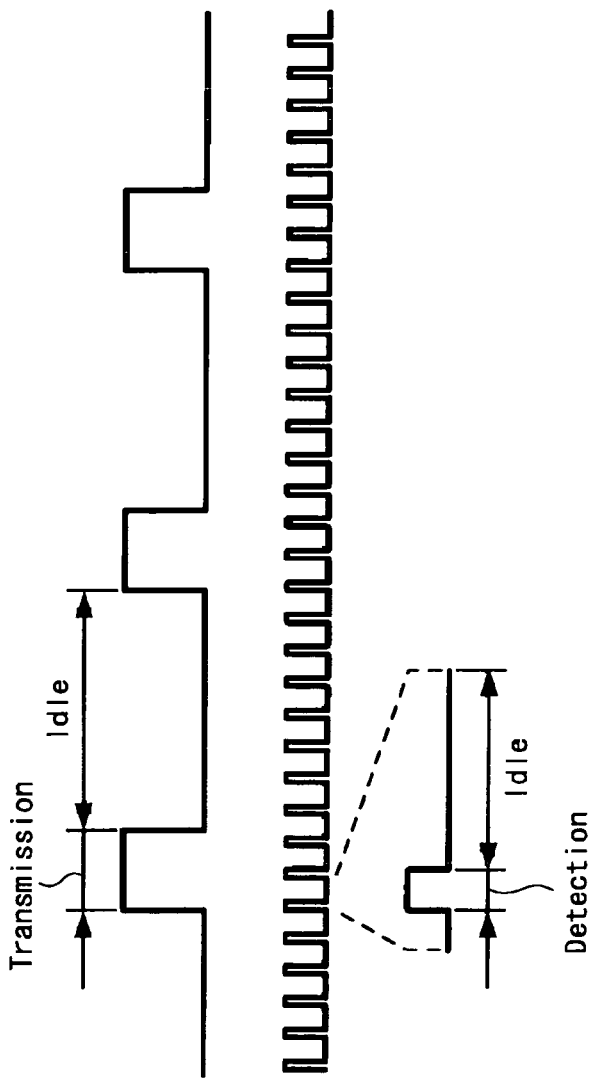
FIGS. 12A and 12B are timing diagrams showing an example of a process state of a page transmission and a scanning according to one exemplified embodiment of the present invention.

FIGS. 12A and 12B are diagrams showing an example of a communication state between the apparatus which became the master (wireless key apparatus 50) in which the process of the flowchart in FIG. 11 is carried out and the apparatus which became the master slave (mobile telephone terminal apparatus 10) in which the process of the flowchart in FIG. 10 is carried out. FIG. 12A shows a transmission timing of the page signal and an idle period of the master (wireless key apparatus 50). FIG. 12B shows a receiving (scan) timing and an idle period of the slave (mobile telephone terminal apparatus 10). As shown in FIGS. 12A and 12B, the idle period of the transmission side and the idle period of the receiving side are different from each other and it is constituted such that the page signal transmitted at any one of timings can be received on the receiving side.

Figure 13:
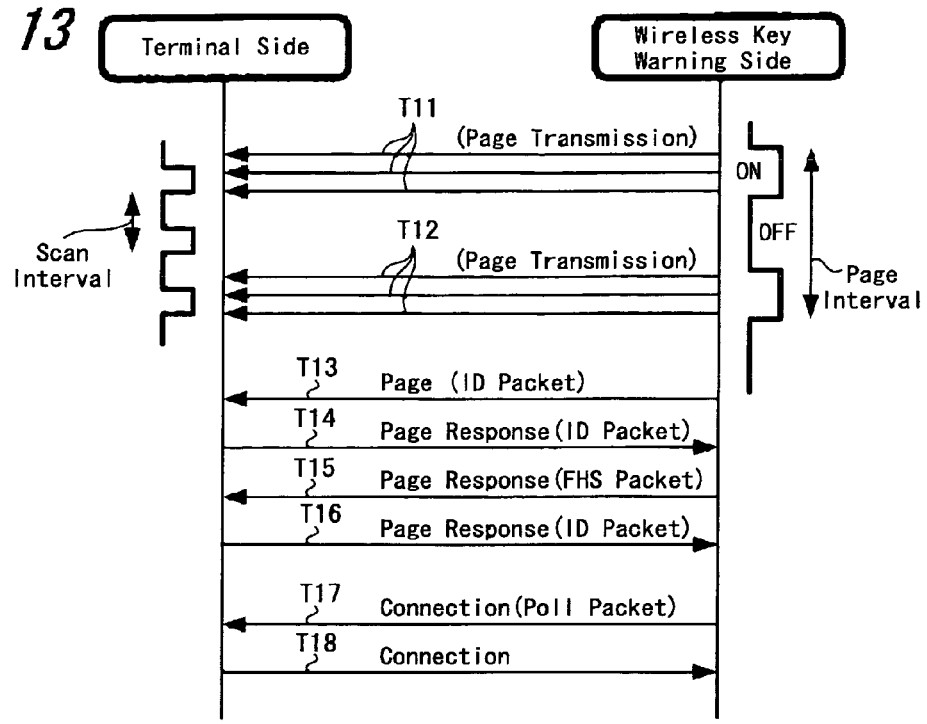
FIG. 13 is a sequence diagram showing an example of a connection state according to one exemplified embodiment of the present invention.

FIG. 13 is a diagram showing the process of FIG. 12 by a sequence diagram. As shown in FIG. 13, the transmission of the page signal is carried out from the wireless key apparatus 50 intermittently (at timing T11, T12, T13). Here, if there is a response with respect to the page signal (at timing T14), mutual exchange of the response between the two apparatuses are further carried out (at timing T15, T16), thereafter mutual exchange of the connection signal performing the wireless connection is carried out (at timing T17, T18) and it is shifted to a data transfer mode.

Next, a process example in a case when the respective apparatuses of the present invention are shifted to the data transfer mode M12 will be explained with reference to a flowchart of FIG. 14. When it is shifted to a data transfer mode, an authentication process in a channel in which the data transfer is carried out is performed (step S31). Then, it is judged whether or not the authentication was completed correctly (step S32). In a case when the authentication process is not completed here, it returns to the connection mode M11.

Then, in a case when the connection process in step S32 is completed, a data transfer is carried out ordinarily, but in the security process of the present invention, the data transfer is not carried out and a process for shifting to a low power consumption mode M13 is carried out directly (step S33). Then, it is judged whether or not it can be shifted to a low power consumption mode (step S34). In case of a state in which it can be shifted to a low power consumption mode M13, it is set to a sniff state of a low power consumption mode M13. In a case when it cannot be shifted to a low power consumption mode, it returns to the connection mode M11.

Figure 14:
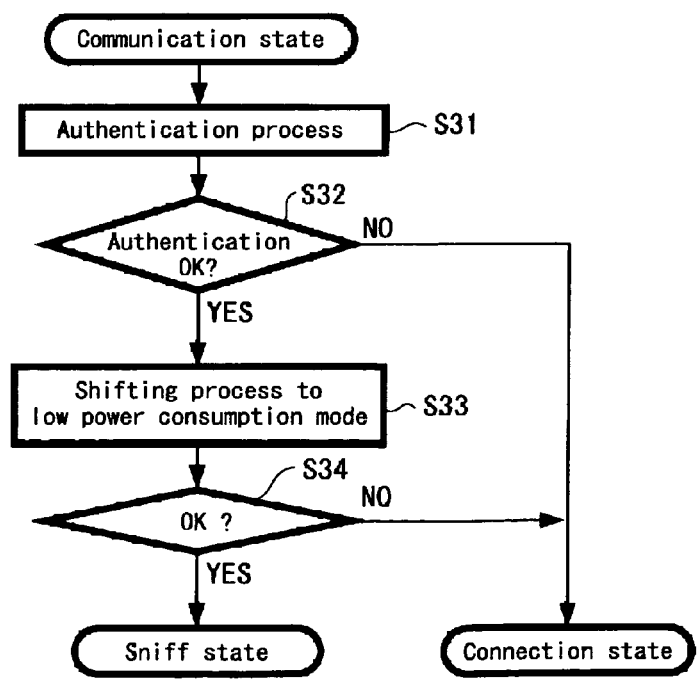
FIG. 14 is a flowchart showing a shifting process example for low power consumption according to one exemplified embodiment of the present invention.
Figure 15:
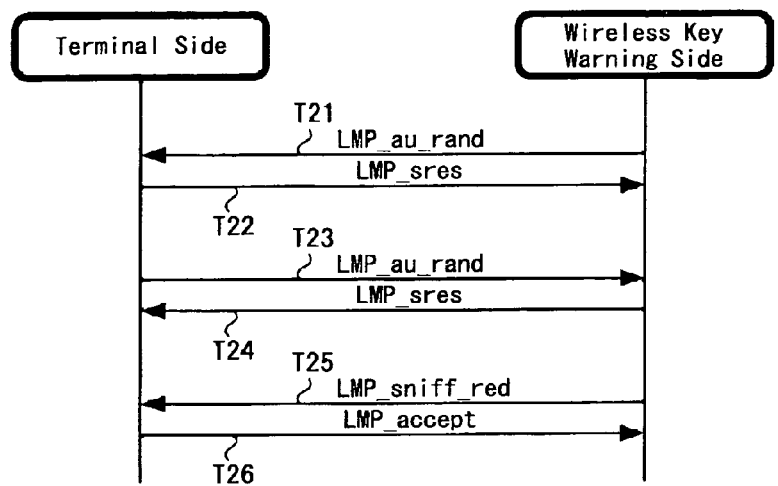
FIG. 15 is a sequence diagram showing a transmission example of a communication state message according to one exemplified embodiment of the present invention.

FIG. 15 is a sequence diagram showing an example of the communication state shown in the flowchart of FIG. 14. More specifically, packet transmission is carried out mutually in the data transfer mode M12 for performing authentication or the like (at timing T21, T22, T23, T24). Then, after the authentication is completed, data (sniff mode request) for shifting to a low power consumption mode is transmitted (at timing T25) from the master (wireless key apparatus 50) and its consent is received (at timing T26) such that both apparatuses are shifted to a low power consumption mode (sniff mode).

Figure 16:
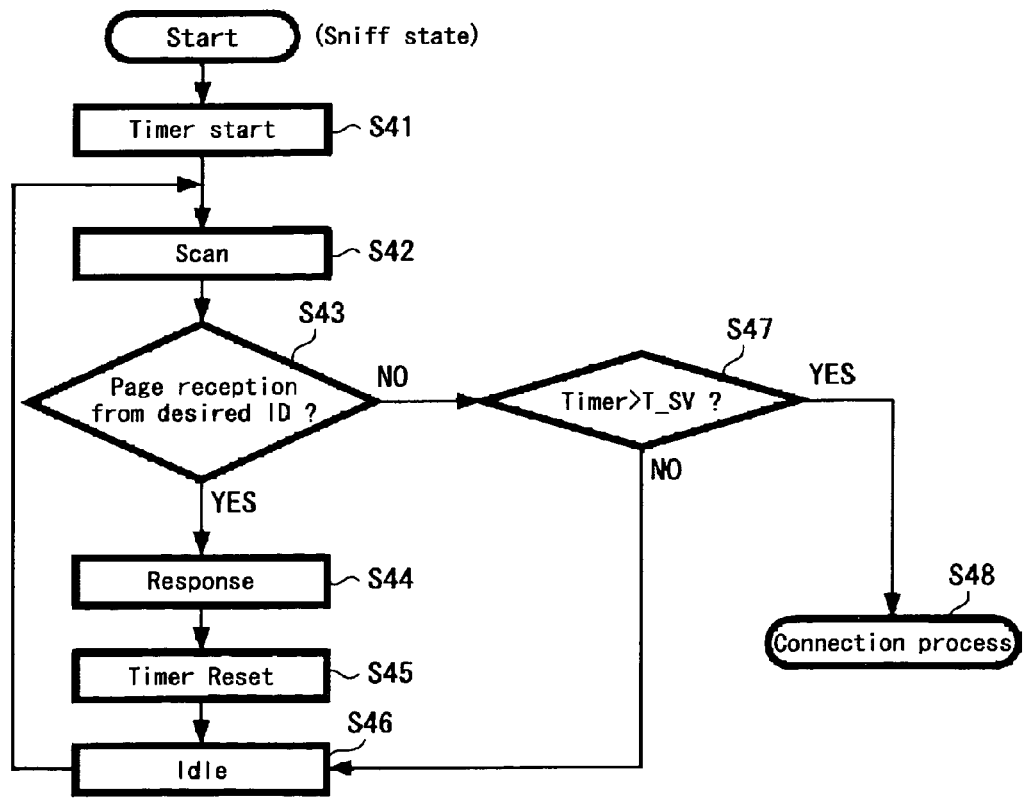
FIG. 16 is a flowchart showing a communication process example in a mobile terminal according to one exemplified embodiment of the present invention.

FIG. 16 is a flowchart showing a process example in a low power consumption mode M13 (sniff mode) relating to the slave (mobile telephone terminal apparatus 10). The process will be explained. When it becomes a sniff mode, first, a timer is started (step S41) and a scan process for receiving a signal from the master is carried out (step S42). It is judged subsequently to the scan process whether or not a signal (page signal) added with the ID number of the wireless key apparatus 50 which is a partner carrying out a security process was received (step S43). Here, in a case when a signal added with the ID number of the wireless key apparatus 50 is received, a response signal with respect to the page signal is transmitted (step S44). Then, the timer started in step S41 is reset (step S45) and it is shifted to an idle period (step S46). When an idle period of a constant period elapses, it returns to the scan process in step S42. Here, in case of the present invention, it is constituted such that the idle period in step S46 (period when communication is not carried out) is set as a relatively longer period and at the same time, it is constituted such that it is synchronized with the idle period on the master side.

On the other hand, in a case when it is judged in step S43 that a signal added with the ID number of the wireless key apparatus 50 is not received, it is judged whether or not the timer started in step S41 exceeded a predetermined value T_SV (step S47). Then, in a case when it does not exceed the predetermined value T_SV, the flow is shifted to the idle process of step S46. Then, in a case when step S47 it is judged it exceeds the predetermined value T_SV, the communication mode is changed to a connection mode M11 (step S48). The transmission power of the transmission amplifier may be changed to be higher when the communication mode is changed to a connection mode.

Figure 17:
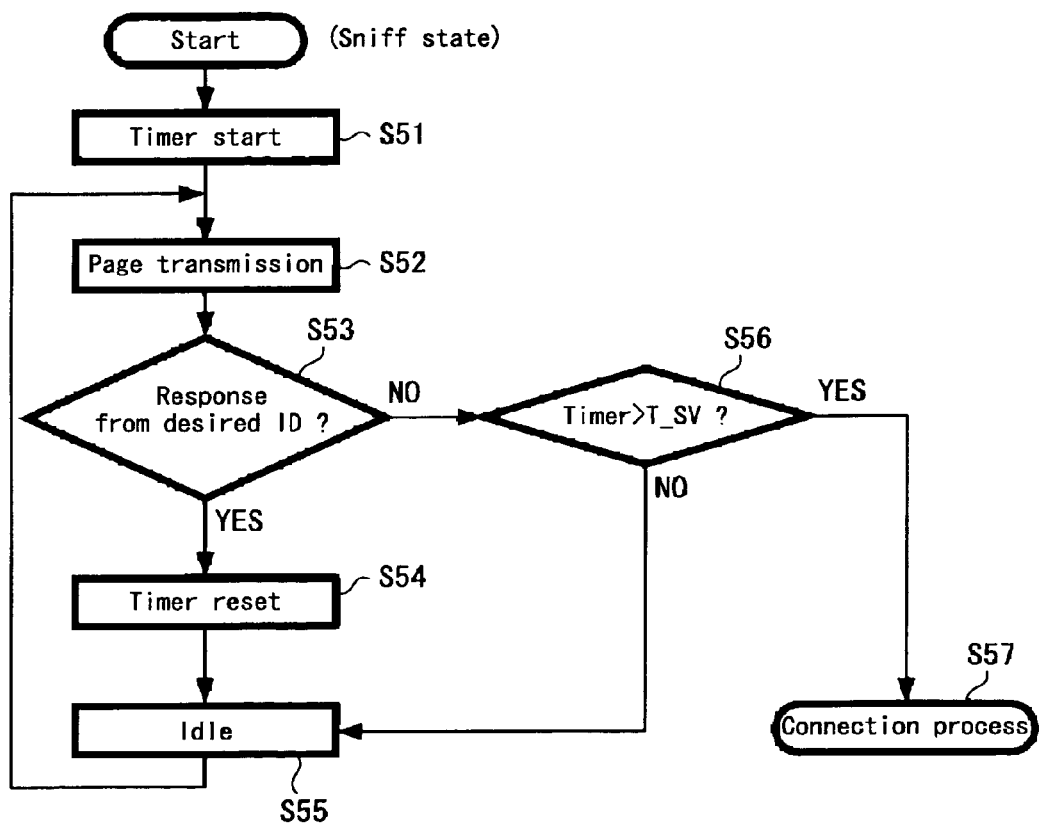
FIG. 17 is a flowchart showing a communication process example in a wireless key apparatus according to one exemplified embodiment of the present invention.

FIG. 17 is a flowchart showing a process example in the master (wireless key apparatus 50) with respect to the low power consumption mode (sniff mode). Its process will be explained. A first timer is started when it becomes a sniff mode (step S51) Then, a process for transmitting a page signal for a predetermined period is carried out (step S52). After the transmission of this page signal, it is judged whether or not a response from a partner (mobile telephone terminal apparatus 10) which carries out a security process was received (step S53). Here, in a case when the response signal is receive, the timer started in step S51 is to be reset (step S54). Then, the flow is shifted to the idle period (step S55). When an idle period of a constant period elapses, the flow returns to the page transmission process of step S52. Here, in case of the present invention, it is constituted such the idle period (period in which the communication is not carried out) in step S55 is to be set as a relatively long period and at the same time is to be synchronized with the idle period on the slave side.

On the other hand, in a case when it is judged in step S53 that a response from the mobile telephone terminal apparatus 10 is not received, it is judged whether or not the timer started in step S51 exceeded a predetermined value T_SV (step S56). In a case when it does not exceed the predetermined value T_SV, it is shifted to the idle process of step S55. Then, in a case when it is judged in step S56 that the predetermined value T_SV is exceeded, the communication mode is changed to a connection mode M11 (step S57). When the communication mode is changed to a connection mode M11, the transmission power of the transmission amplifier may be changed to be high.

Figure 18:
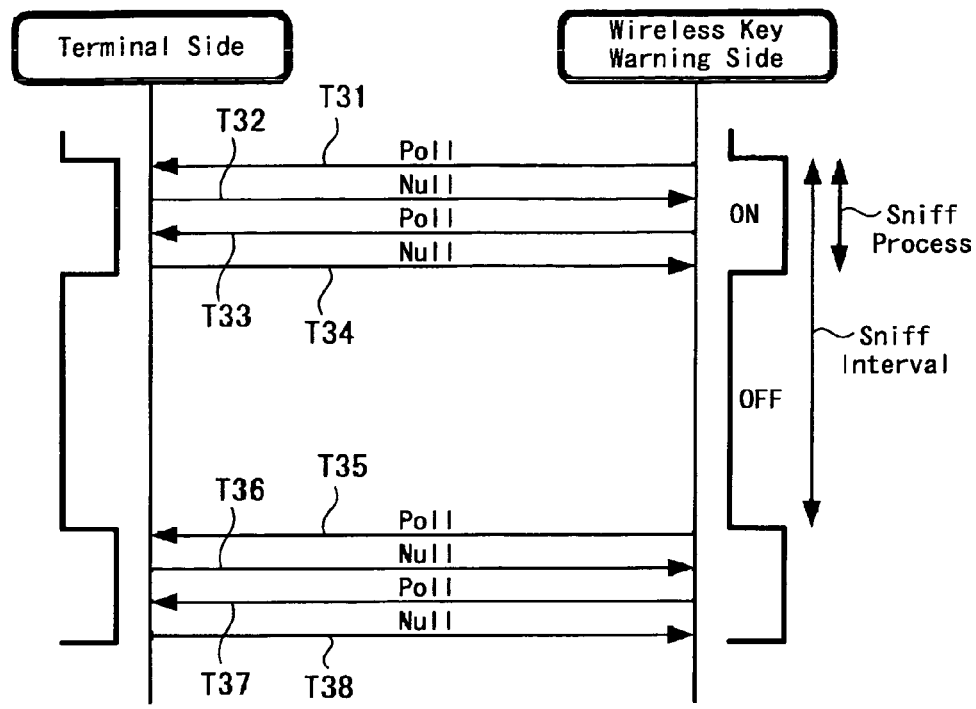
FIG. 18 is a sequence diagram showing a transmission example in a sniff state according to one exemplified embodiment of the present invention.

FIG. 18 is a sequence diagram showing communication timings in the both apparatuses in connection with a low power consumption mode (sniff mode) M13. As shown in FIG. 18, the timing at which the sniff process (portion describes as ON) is carried out in the master and the timing at which the sniff process is carried out in the slave approximately coincide with each other. More specifically, the timings (T31, T33, T35, T37) at which polling packets are transmitted from the master and the periods when the reception thereof are carried out in the slave approximately coincide with each other. Also, respective polling packets are received by the slave and with respect to the responses thereof (at timing T32, T34, T36, T38), they are received on the master side. Owing to the fact that an intermittent bidirectional communication is carried out in this manner, a low power consumption mode M13 is maintained and a wireless connection state between the master and the slave is maintained.

Figure 19:
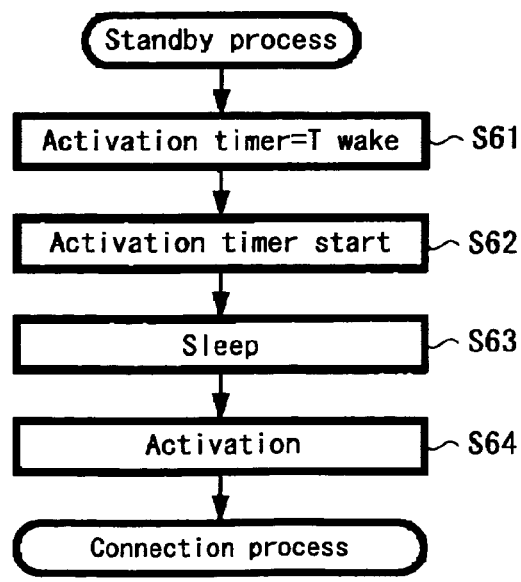
FIG. 19 is a flowchart showing a process example in a standby state according to one exemplified embodiment of the present invention.

It should be noted in a case when the communication mode becomes a standby state that, for example, a process shown in a flowchart of FIG. 19 is carried out. More specifically, when it becomes a standby state, an activation period is set for an activation timer (step S61). Then, the activation timer is started (step S62). Then, the communication circuit is made to be in a sleep state (step S63). Thereafter, when the period set by the activate timer elapses, the communication circuit is activated (step S64) and the flow is shifted to the connection mode M11 so as to execute a connection process.

Owing to a fact that the processes explained so far are executed, in a case when the mobile telephone terminal apparatus 10 and the wireless key apparatus 50 can wireless-communicate favorably in an adjacent state, the mobile telephone terminal apparatus 10 and the wireless key apparatus 50 are maintained in a wireless-connected state using a low power consumption mode. In this wireless-connected state using the low power consumption mode, a data transfer which becomes a so-called payload is not carried out and a signal for maintaining the wireless connection is only transmitted and received intermittent. In this case, by selecting the idle period properly, it is possible to carry out a communication with very low power consumption. Therefore, it is possible to lower the power consumption caused by carrying out the security process of the present invention and it is possible to make the battery duration periods of both the mobile telephone terminal apparatus 10 and the wireless key apparatus 50 be a longer period. In particular, there is a big effect on a wireless key apparatus which is desired to be constituted in a small size as much as possible.

Also, with respect to the mobile telephone terminal apparatus 10, a security process was carried out by applying a short distance wireless communication system of the Bluetooth system which has a great number of examples already mounted on mobile telephone terminals, so that the security process of the present invention can be realized only by slightly changing a control constitution or the like of a mobile telephone terminal provided with a short distance wireless communication circuit of an existing Bluetooth system and a favorable security function is realized easily.

Figure 20:
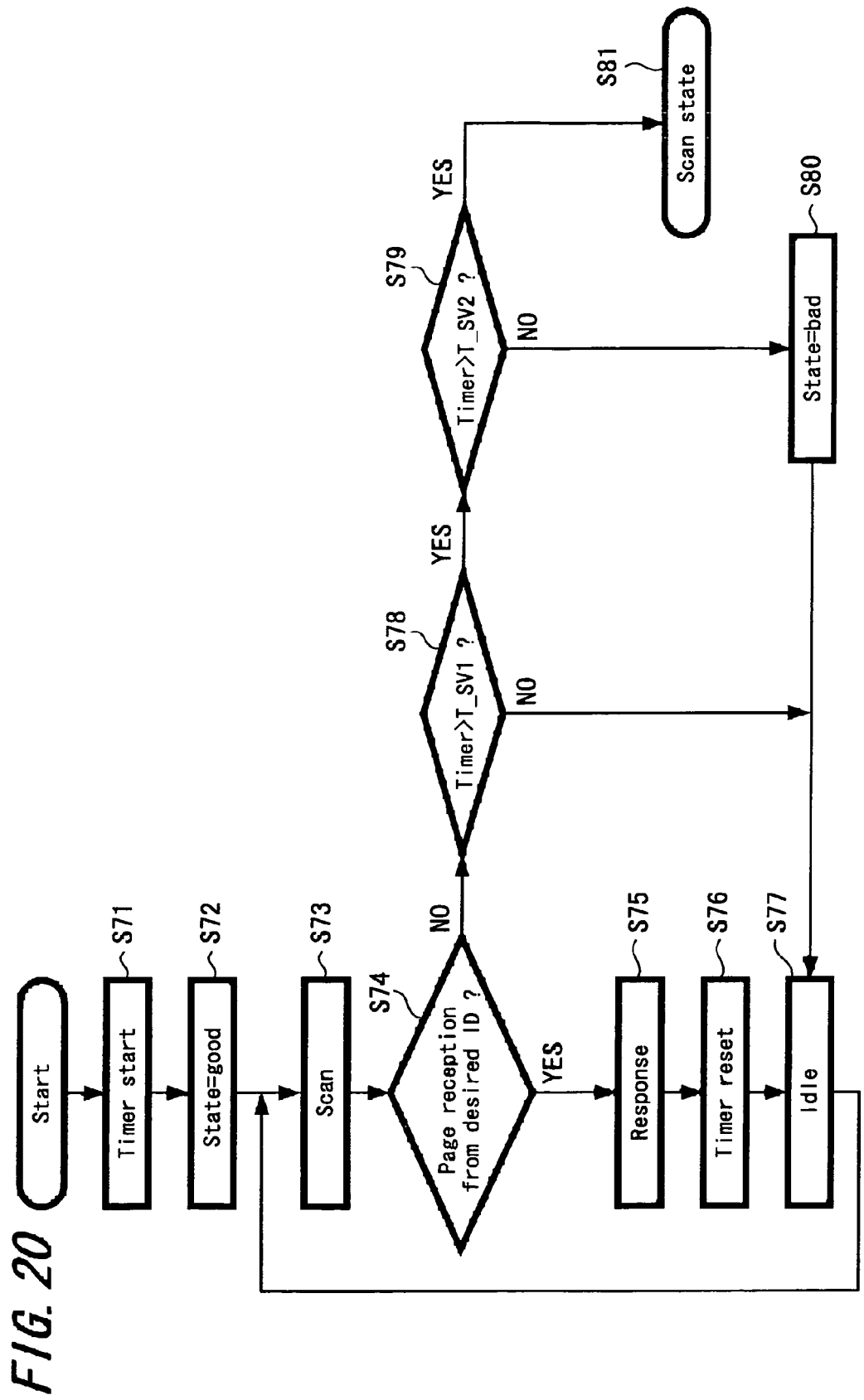
FIG. 20 is a flowchart showing a mode selection process example on a terminal side according to another exemplified embodiment of the present invention.
Figure 21:
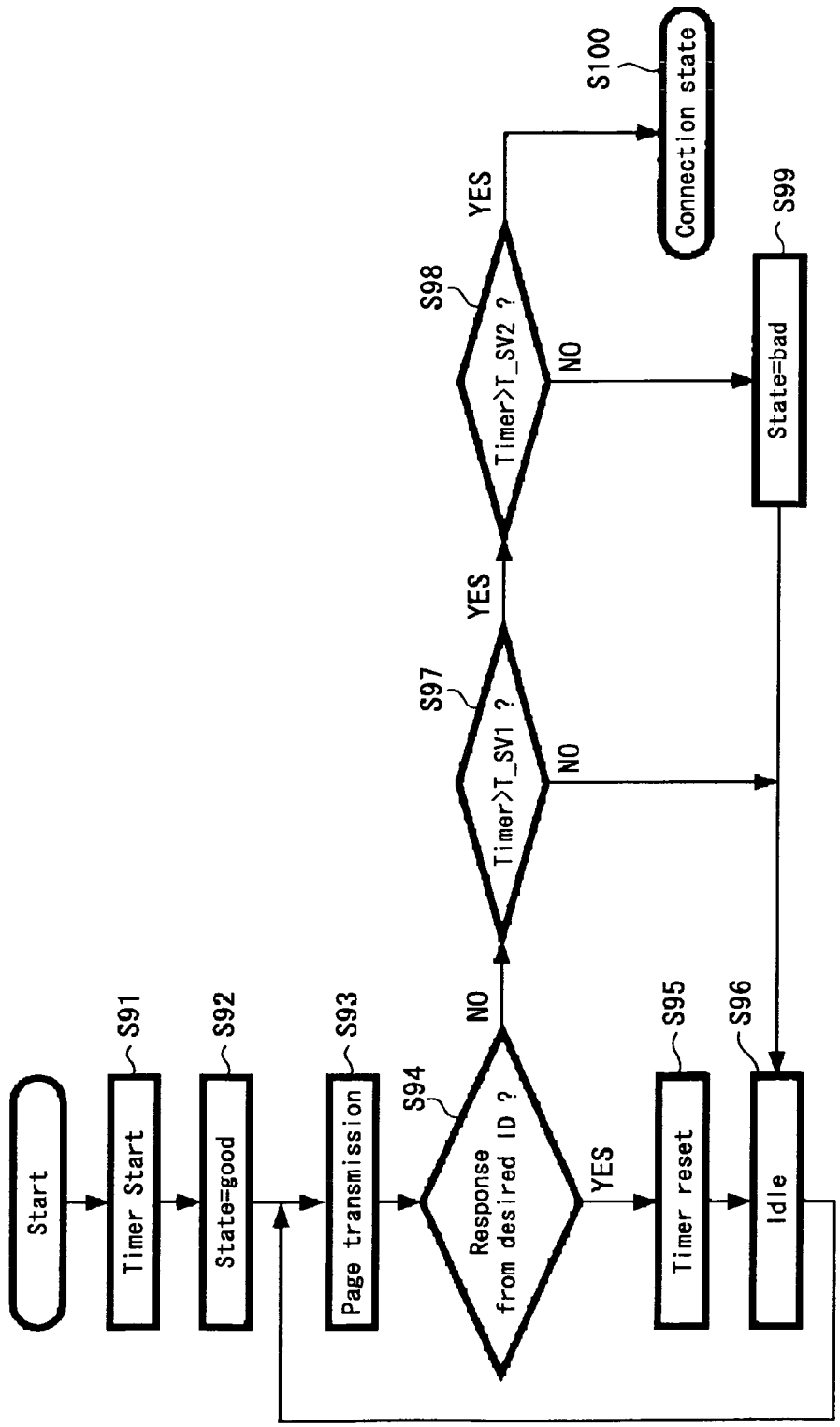
FIG. 21 is a flowchart showing a mode selection process example on a wireless key apparatus side according to another exemplified embodiment of the present invention.
Figure 22:
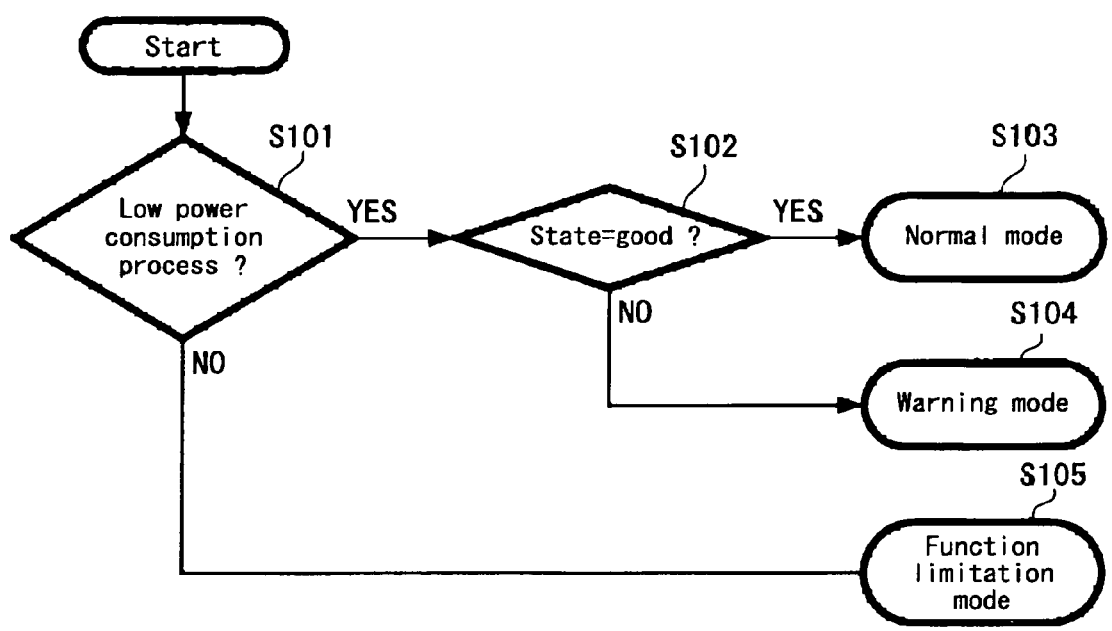
FIG. 22 is a flowchart showing an example of a mode selection state in case of FIGS. 21 and 22.

Here, in the exemplified embodiments mentioned above, it was constituted such that shifting from a low power consumption mode to a connection mode is processed (more specifically, processed according to the connection/cutoff of the communication or the signal strength) simply by whether or not it is a state in which a wireless communication is possible between two apparatuses, but it may be constituted such that it is judged by a detection state of packets from the partner. FIGS. 20 to 22 are diagrams showing a process example in a case thereof.

First, a process example in a slave (mobile telephone terminal apparatus 10) is shown in a flowchart of FIG. 20. When the mobile telephone terminal apparatus 10 becomes in a low power consumption mode (sniff mode), a timer is started (step S71). Then, "good" is set as a communicate state (step S72). Then, a scan process for receiving a signal from a master is carried out (step S73). It is judged in its scan process whether or not a signal (page signal) added with an ID number the wireless key apparatus 50 which is a partner carrying out a security process was received (step S74). Here, in a case when a signal added with the ID number of the wireless key apparatus 50 was received, a response signal with respect to that page signal is transmitted (step S75) and the timer started in step S71 is reset (step S76). Then, the flow is shifted to an idle period (step S77). When the idle period of a constant period elapses, the flow returns to the scan process of step S73. This idle period is synchronized the idle period on the master side.

In a case when it is judged in step S74 that the signal added with the ID number of the wireless key apparatus 50 cannot be received, it is judged whether or not the timer started in step S71 exceeded a first predetermined value T_SV1 (step S78). In a case when the predetermined value T_SV1 is not exceeded, it is shifted to the idle process of step S77. Then, in a case when it is judged in step S78 that the predetermined value T_SV1 was exceeded, the timer further judges whether or not a second predetermined value T_SV2 was exceeded (step S79). It should be noted that the second predetermined value T_SV2 is a period longer than that of the first predetermined value T_SV1. Here, in a case when it is judged the second predetermined value T_SV2 is not exceeded, "bad" is set as a communicate state (step S80), it is shifted to the idle process of step S77. In a case when it is judged in step S79 that the second predetermined value T_SV2 was exceeded, the communication mode is changed to a connection mode (step S81).

Next, a process example in a master (wireless key apparatus 50) here will be explained with reference to a flowchart of FIG. 21. When it becomes a sniff mode, a first timer is started (step S91). Then, "good" is set as a communicate state (step S92). Then, a process for transmitting a page signal for a predetermined period is carried out (step S93). After the transmission of this page signal, it is judged whether or not a response from the partner (mobile telephone terminal apparatus 10) which carries out a security process was received (step S94). Here, in a case when a response signal was received, the timer started in step S91 is reset (step S95) and the flow is shifted to an idle period (step S96). When an idle period of a constant period elapses, the flow returns to the scan process of step S93. This idle period is synchronized with the idle period on the slave side.

Then, in a case when it is judged in step S94 that a response from the mobile telephone terminal apparatus 10 cannot be received, it is judged whether or not the timer started in step S91 exceeded a first predetermined value T_SV1 (step S97). In a case when the predetermined value T_SV1 is not exceeded, the flow is shifted to an idle process of step S96. Then, in a case when it is judged in step S97 that the predetermined value T_SV1 was exceeded, it is further judged whether or not the timer exceeded a second predetermined value T_SV2 (step S98). It should be noted that the second predetermined value T_SV2 is a period longer than that of the first predetermined value T_SV1. Here, in a case when it is judged that the second predetermined value T_SV2 was not exceeded, "bad" as a communication state is set (step S99). Then the flow is shifted to an idle process of step S96. In a case when it is judged in step S98 that the second predetermined value T_SV2 was exceeded, the communication mode is changed to a connection mode (step S100).

Then, in case of being processed as shown in FIGS. 20 and 21, the security mode selection is to be set according to the judgment as shown in FIG. 22. More specifically, it is judged first whether or not the communication mode is a low power consumption mode (step S101). In case of a low power consumption mode, it is judged whether or not the communicate state set by the flowchart of FIG. 20 and FIG. 21 is "good" (step S102). Here, in a case when the communicate state is "good", the security mode is made to be a normal mode M11 (step S103). Then, in a case when the communicate state is "bad" in step S102, the security mode is made to be a warning mode M2 (step S104). Further, in a case when it is judged in step S101 that it is not a low power consumption mode, the security mode is made to be a function limitation mode M3 (step S105).

By being process as shown in the flowchart of FIG. 22, it becomes a warning mode in a state in which possibility of shifting from the low power consumption mode to the connection mode became high and it is possible to carry out a warning favorably.

It should be noted in the wireless key apparatus 50 of the present invention that the operation unit 59 is provided. Then, it is constituted in a case when the control unit 53 detects that the operation unit 59 was operated such that the transmission power of the transmission amplifier 52a is made to be high temporarily. When the process for making it to be high temporarily is carried out, there is a high possibility that it becomes impossible for a signal from the wireless key apparatus to be received correctly on the side of the mobile telephone terminal apparatus 10 at a stage in which the transmission power returns to the original state after it became high. When the signal from the wireless key apparatus cannot be received correctly on the side of the mobile telephone terminal apparatus 10 in this manner, the state communicating in a low power consumption mode becomes a connection mode. Then, the security mode of the mobile telephone terminal apparatus 10 becomes a warning mode. Here, if it is constituted such that it is set so as to ring a warning sound when the mobile telephone terminal apparatus 10 becomes in a warning mode, the warning sound is to begin ringing. Consequently, it is effective, for example, in a case when the mobile telephone terminal apparatus 10 becomes unrecognized where it is.

Also, it may be constituted in a case when the operation unit 59 of the wireless key apparatus 50 is operated such that data for instructing a warning sound being rung compulsorily are wireless-transmitted with respect to the mobile telephone terminal apparatus 10 under a control of the control unit 53 or data instructing for shifting to a warning mode compulsorily is to be wireless-transmitted. Further, it also may be constituted such that the process for heightening the transmission power temporarily and the process for wireless-transmitting data instructing a warning sound to be rung or the like are to be combined.

Further, it was explained in the exemplified embodiments mentioned above with respect to processes for setting the security mode in a wireless communication state between the mobile telephone terminal and the wireless key apparatus, but it may be constituted in a case when the security mode becomes a function limitation mode by a process in a state other than a wireless communication state such that a process for returning to the normal mode is to be carried out. It may be constituted, for example, such that a password for a release is to be inputted to the mobile telephone terminal which became in a function limitation mode so as to return it to a normal mode.

Alternatively, by connecting the terminal unit 56 of the wireless key apparatus 50 to the terminal unit 23 prepared in the mobile telephone terminal 10 directly as shown in FIG. 1, it may be constituted such that the connected two apparatuses are recognized directly so as to make it in a normal mode compulsorily. In a case when, it may be constituted such that it is set by disconnecting the wireless key apparatus 50 from the mobile telephone terminal 10 for returning to the security mode according to the wireless communication state. By doing in this manner, even in a case when, for example, the battery remaining amount in the wireless key apparatus 50 disappeared and it becomes a state in which a wireless communication cannot be carried out, the function limitation mode can be released, as long as possessing the wireless key apparatus 50, by connecting the wireless key apparatus 50 to the mobile telephone terminal 10 directly and by actuating the wireless key apparatus 50 by means of the power supply from the mobile telephone terminal 10.

It should be noted in case of connecting directly in this manner that it becomes possible to use the wireless key apparatus 50 again in wireless if the secondary battery in the wireless key apparatus 50 is to be charged by the power supply from the mobile telephone terminal 10.

Also, a construction in which the power supply unit mounted with a secondary battery of the wireless key apparatus 50 is detachable is employed such that a construction in which it is possible for the removed power supply unit to be connected to the terminal unit 23 of the mobile telephone terminal 10 can be employed. Then, it may be constituted such that a charge of the secondary battery in the power supply unit is to be carried out directly on the side of the terminal 10. In this case, for example, two sets of a power supply unit (battery pack) mounted with a secondary battery are prepared and if one is used by being mounted on the wireless key apparatus 50 and at the same time the other one is charged by being connected to the mobile telephone terminal 10, it becomes possible to operate the wireless key apparatus 50 for a long period continuously.

Also, in the exemplified embodiment mentioned above, short distance wireless communication means of such as Bluetooth system or the like was installed in the mobile telephone terminal 10 and the short distance wireless communication means was used for actuating the security mode, but it may be constituted, for example, such that the short distance wireless communication is not installed in the mobile telephone terminal 10 the short distance wireless communication means is to be connected to the mobile telephone terminal 10 externally. More specifically, for example, two of an apparatus which corresponds to the wireless key apparatus are prepared and one of the two wireless key apparatuses is connected to the mobile telephone terminal 10 such that the security mode is to be set according to the communication mode of the two of wireless key apparatuses.

Also, in the exemplified embodiment explained so far, a communication circuit of a Bluetooth system was installed in a mobile telephone terminal such that a wireless communication is to be carried out with the wireless key apparatus by that communication circuit, but it may be constituted such that a wireless communication is to be carried out with the wireless key apparatus by means of another wireless communication system. More specifically, if it is a system which at least includes a first communication mode which enables a data transfer as a wireless communication system between both apparatuses which communicate each other and a second communication mode which carries out a wireless communication between both the apparatuses in a period shorter than that of the communication in the first communication mode in a wireless-connected state maintained, similar processes as those of the exemplified embodiment mentioned above are possible and applicable.

Also, in case of the Bluetooth system, one of the apparatuses which carry out a communication becomes a master and the other one becomes slave and to make the above mentioned wireless key apparatus side be a master and to make the mobile terminal side be a slave is only one example and it is allowed to reverse the relation there-between. Also, it may be constituted such that the master and the slave are counter-changed on the communication halfway.

Also, in the exemplified embodiment mentioned above, it was applied to the security assuring process of the mobile telephone terminal apparatus, but it may be constituted such that it is applied to a process for assuring the security of other mobile type.

Further, also with respect to the wireless key apparatus, an example which was constituted as a key apparatus for exclusive use was employed in the exemplified embodiment mentioned above, but it may be constituted such that a program which makes if function as a key apparatus of the present invention is installed to a terminal apparatus capable of communicating by the Bluetooth system or the like (for example, PDA apparatus or the like) so as to function as a key apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. A communication system in which a communication terminal apparatus and a wireless key apparatus are provided and a wireless communication is possible by a predetermined wireless communication system which has a first communication mode attempting at least a wireless connection by a first period for carrying out a wireless connection between said communication terminal apparatus and said wireless key apparatus and a second communication mode carrying out a wireless communication between said communication terminal apparatus and said wireless key apparatus by a second period longer than that in said connection mode in a case when said wireless connection is executed, wherein said communication terminal apparatus comprises:

first communication means for carrying out a wireless communication with said wireless key apparatus by said predetermined wireless communication system;

mode setting means for setting a normal mode which makes a predetermined function of said communication terminal apparatus operable and a function limitation mode which limits the operation of said predetermined function; and first control means for controlling said mode setting means so as to be set in a normal mode in a case when said first communication means communicates with said wireless key apparatus by being set in said second communication mode and for controlling said mode setting means so as to be set in a function limitation mode in a case when said first communication means communicates with said wireless key apparatus by being set in said first communication mode, and said wireless key apparatus comprises:

second communication means for carrying out a wireless communication with said communication terminal apparatus by said predetermined wireless communication system;

first warning means for carrying out a predetermined warning operation; and second control means for controlling said warning means so as to execute a warning operation in a case when said second communication means is setting-changed from said second communication mode to said first communication mode.

2. A communication system according to claim 1, wherein said communication terminal apparatus comprises, in addition to said communication means, communication means for telephone communication which carries out a wireless communication for a telephone communication with a predetermined base station.

3. A communication system according to claim 1, wherein said communication terminal apparatus comprises second warning means for carrying out a predetermined warning operation, and clocking means; the first control means of said communication terminal apparatus carries out clocking by controlling said clocking means in a case when the setting of said communication mode is setting-changed from said second mode to said first mode; said second warning means is controlled so as to perform a warning operation for said predetermined period until said clocking means makes clocking for a predetermined period; and after clocking for the predetermined period, said mode setting means is controlled so as to set to a function limitation mode.

4. A communication system according to claim 1, wherein said predetermined wireless communication system includes a third communication mode to be shifted thereto in a case when said wireless connection is not executed in said first communication mode, and the first control means of said communication terminal apparatus controls said mode setting means to set a function limitation mode also in a case when said third mode is set.

5. A communication system according to claim 1, wherein said wireless key apparatus includes operation means, the second communication means of said wireless key apparatus includes transmission power amplifying means for making the transmission power settable at least in two steps, and the second control means of said wireless key apparatus controls said second communication means so as to set the transmission power of said transmission power amplifying means in larger one of the powers temporarily in a case when said operation means is operated.

6. A communication system according to claim 5, wherein said communication terminal apparatus includes second warning means for carrying out a predetermined warning operation and the second control means of said wireless key apparatus controls said second communication means in a state in which the transmission power of the transmission power amplifying means of said wireless key apparatus is set in a larger one of powers such that data for operating the second warning means of said communication terminal apparatus are transmitted.

7. A communication system according to claim 1, wherein said wireless key apparatus includes mode display means, and the second communication means of said wireless key apparatus controls such that information designating the set mode among said normal mode, said function restriction/limitation mode and said warning mode is to be displayed on said mode display means.

8. A communication system according to claim 1, wherein said communication terminal apparatus includes first connection means, said wireless key apparatus includes second connection means for being connected directly with the first connection means of said communication terminal apparatus, and the first control means of said communication terminal apparatus controls in a case when said first and second connection means are directly connected such that the power of said communication terminal apparatus is to be supplied to the power supply means of said wireless key apparatus by way of said first and second connection means.

9. A communication system in which a communication terminal apparatus and a wireless key apparatus are provided and a wireless communication is possible by a predetermined wireless communication system which has a first communication mode attempting at least a wireless connection by a first period for carrying out a wireless connection between said communication terminal apparatus and said wireless key apparatus and a second communication mode carrying out a wireless communication between said communication terminal apparatus and said wireless key apparatus by a second period longer than that in said connection mode in a case when said wireless connection is executed, wherein said communication terminal apparatus comprises:
first communication means for carrying out a wireless communication with said wireless key apparatus by said predetermined wireless communication system;
mode setting means for setting a normal mode which makes a predetermined function of said communication terminal apparatus operable and a function limitation mode which limits the operation of said predetermined function; and
first control means for controlling said mode setting means so as to be set in a normal mode in a case when said first communication means communicates with said wireless key apparatus by being set in said second communication mode and for controlling said mode setting means so as to be set in a function limitation mode in a case when said first communication means communicates with said wireless key apparatus by being set in said first communication mode, and said wireless key apparatus comprises:
second communication means for carrying out a wireless communication with said communication terminal apparatus by said predetermined wireless communication system;
first warning means for carrying out a predetermined warning operation judgment means for judging whether or not a response signal with respect to a predetermined signal transmitted to said communication terminal apparatus according to said second period in a state in which said second communication; and
second control means for controlling said first warning means so as to carry out a warning operation during said predetermined period in a case when it is judged that said judgment means does not receive said response signal and in a case when a predetermined period did not elapse and for controlling said second communication means so as to set said first communication mode in a case when said predetermined period elapsed.

10. A communication system according to claim 9, wherein said communication terminal apparatus includes second warning means for carrying out a predetermined warning operation, and judgment means for judging whether or not a predetermined signal transmitted from said communication terminal apparatus was received according to said second period in a state in which said first communication means is set in said second communication mode; said first control means controls said first communication means in a case when said judgment means judged that a predetermined signal was received such that said response signal is to be transmitted to said wireless key apparatus; in a case when said judgment means judged that the predetermined signal was received and in a case when a predetermined time period does not elapse, said second warning means sets a warning mode operating for said predetermined time period; and in a case when said predetermined time period elapsed, the communication mode is set to a first communication mode.

11. A communication terminal apparatus which can carry out a wireless communication by a predetermined wireless communication system which includes at least a first communication mode attempting a wireless connection by a first period for carrying out a wireless communication with a partner apparatus to be communicated and a second communication mode for carrying out a wireless communication with said partner apparatus by a second period longer than said connection mode in a case when said wireless connection is executed comprising:

communication means for carrying out a wireless communication with said wireless key apparatus by said predetermined wireless communication system;
mode setting means for setting a normal mode which makes a predetermined function of said communication terminal apparatus operable and a function limitation mode which limits said predetermined function operation; and
control means for setting said mode setting means in a normal mode in a case when said communication means communicates with said partner apparatus by being setting in said second communication mode and for controlling said mode setting means to be set in a function limitation mode in a case when it communicates by being setting in said first communication mode.

12. A communication terminal apparatus according to claim 11 further comprising: communication means for a telephone communication for carrying out a wireless communication for a telephone communication with a predetermined base station in addition to said communication means.

13. A communication terminal apparatus according to claim 11, wherein said communication terminal apparatus includes warning means for carrying out a predetermined warning operation, and clocking means; and said control means controls said mode setting means such that clocking is carried out by controlling said clocking means in a case when said communication mode setting is setting-changed from said second communication mode to said first mode, said warning means is controlled so as to carry out warning operation during said predetermined time period until said clocking means clocks a predetermined time period, and a function limitation mode is set after clocking a predetermined time period.

14. A communication terminal apparatus according to claim 11, wherein said predetermined wireless communication system includes a third communication mode to which the mode is shifted in a case when said wireless connection is not executed in said first communication mode and said control means controls said mode setting means so as to set a function limitation mode even in a case when said third mode is set.

15. A communication terminal apparatus according to claim 11, wherein said communication terminal apparatus includes connection means for connecting with said partner apparatus directly, said control means controls in a case when said connection means is connected directly such that the power of said communication terminal apparatus is to be supplied to the power supply means of said non-partner apparatus by way of said connection means.

16. A wireless key apparatus in which a wireless communication is possible by a predetermined wireless communication system having at least a first communication mode attempting a wireless connection by a first period in order to carry out a wireless communication with a partner apparatus to be communicated and a second communication mode carrying out a wireless communication with said partner apparatus by a second period longer than said connection mode in a case when said wireless connection is executed comprising:

communication means for carrying out a wireless communication with said partner apparatus by said predetermined wireless communication system;

warning means for carrying out a predetermined warning operation; and control means for controlling said warning means so as to carry out a warning operation in a case when said communication means is setting-changed from said second communication mode to said first communication mode.

17. A wireless key apparatus according to claim 16, wherein said wireless key apparatus includes operation means, said communication means includes transmission power amplifying means for making the transmission power settable at least in two steps, and the control means controls said second communication means so as to set the transmission power of said transmission power amplifying means in larger one of the powers temporarily in a case when said operation means is operated.

18. A wireless key apparatus according to claim 17, wherein said control means controls said communication means in a state in which the transmission power of said transmission power amplifying means is set to larger one of powers such that data for operating a second warning means which said partner apparatus includes are to be transmitted.

19. A wireless key apparatus according to claim 16, wherein said wireless key apparatus includes mode display means, said control means controls so as to display, on said mode display means, information designating a set mode among the modes of a normal mode, a function limitation mode and a warning mode which are states of said partner apparatus.

20. A wireless key apparatus according to claim 16, wherein said wireless key apparatus includes connection means for being connected directly with said partner apparatus and said control means controls in a case when said connection means is connected directly such that the power supplied from said partner apparatus by way of said connection means is to be charged in the power supply means.

21. In a communication system in which a communication terminal apparatus and a wireless key apparatus are provided and a wireless communication is possible by a predetermined wireless communication system which has a first communication mode attempting at least a wireless connection by a first period for carrying out a wireless connection between said communication terminal apparatus and said wireless key apparatus and a second communication mode carrying out a wireless communication between said communication terminal apparatus and said wireless key apparatus by a second period longer than that in said connection mode in a case when said wireless connection is executed, a wireless key apparatus comprising:

communication means for carrying out a wireless communication with said partner apparatus by said predetermined wireless communication system;

warning means for carrying out a predetermined warning operation;

judgment means for judging whether or not said communication means received a response signal with respect to a predetermined signal transmitted to said communication terminal apparatus according to said second period in a state set to said second communication mode; and control means for controlling said warning means so as to carry out a warning operation during said predetermined period in a case when it is judged that said judgment means does not receive said response signal and in a case when a predetermined period did not elapse and for controlling said communication means so as to set said first communication mode in a case when said predetermined period elapsed.

22. A program installed in a communication terminal apparatus which can carry out a wireless communication by a predetermined wireless communication system which includes at least a first communication mode attempting a wireless connection by a first period for carrying out a wireless communication with a partner apparatus to be communicated and a second communication mode for carrying out a wireless communication with said partner apparatus by a second period longer than said connection mode in a case when said wireless connection is executed comprising:

a communication process for carrying out a wireless communication with said wireless key apparatus by said predetermined wireless communication system;

a mode setting process for setting a normal mode which makes a predetermined function of said communication terminal apparatus operable and a function limitation mode which limits the operation of said predetermined function; and a control process for controlling said mode setting process so as to be set in a normal mode in a case when said communication process communicates with said partner apparatus by being set in said second communication mode and for controlling said mode setting process so as to be set in a function limitation mode in a case when said communication process communicates with said partner apparatus by being set in said first communication mode.

23. A communication terminal apparatus which can carry out a wireless communication by a predetermined wireless communication system which includes at least a first communication mode attempting a wireless connection by a first period for carrying out a wireless communication with a partner apparatus to be communicated and a second communication mode for carrying out a wireless communication with said partner apparatus by a second period longer than said connection mode in a case when said wireless connection is executed comprising:

a communication circuit for carrying out a wireless communication with said wireless key apparatus by said predetermined wireless communication system;

a mode setting unit for setting a normal mode which makes a predetermined function of said communication terminal apparatus operable and a function limitation mode which limits the operation of said predetermined function; and a control unit for controlling said mode setting unit so as to be set in a normal mode in a case when said communication circuit communicates with said partner apparatus by being set in said second communication mode and for controlling said mode setting unit so as to be set in a function limitation mode in a case when said communication circuit communicates with said partner apparatus by being set in said first communication mode.

24. A wireless key apparatus which can carry out a wireless communication by a predetermined wireless communication system which includes at least a first communication mode attempting a wireless connection by a first period for carrying out a wireless communication with a partner apparatus to be communicated and a second communication mode for carrying out a wireless communication with said partner apparatus by a second period longer than said connection mode in a case when said wireless connection is executed comprising:

- a communication circuit for carrying out a wireless communication with said wireless key apparatus by said predetermined wireless communication system;
- a mode setting unit for setting a normal mode which makes a predetermined function of said communication terminal apparatus operable and a function limitation mode which limits the operation of said predetermined function; and
- a control unit for controlling said mode setting unit so as to be set in a normal mode in a case when said communication circuit communicates with said partner apparatus by being set in said second communication mode and for controlling said mode setting unit so as to be set in a function limitation mode in a case when said communication circuit communicates with said partner apparatus by being set in said first communication mode.

* * * * *